United States Patent
Tatebayashi et al.

(10) Patent No.: US 7,723,956 B2
(45) Date of Patent: May 25, 2010

(54) BATTERY MODULE SYSTEM, METHOD OF CHARGING BATTERY MODULE AND CHARGING TYPE VACUUM CLEANER

(75) Inventors: Yoshinao Tatebayashi, Yokohama (JP); Hiroki Inagaki, Kawasaki (JP); Yasuhiro Harada, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 665 days.

(21) Appl. No.: 11/688,461

(22) Filed: Mar. 20, 2007

(65) Prior Publication Data

US 2007/0229034 A1 Oct. 4, 2007

(30) Foreign Application Priority Data

Mar. 30, 2006 (JP) ............................. 2006-096001

(51) Int. Cl.
H02J 7/00 (2006.01)
(52) U.S. Cl. ...................... 320/119; 320/132; 324/427
(58) Field of Classification Search ............... 320/119, 320/132
See application file for complete search history.

(56) References Cited

U.S. PATENT DOCUMENTS

| | | | | |
|---|---|---|---|---|
| 5,644,212 A | * | 7/1997 | Takahashi | 320/134 |
| 5,747,968 A | * | 5/1998 | Merritt et al. | 320/119 |
| 5,869,950 A | * | 2/1999 | Hoffman et al. | 320/103 |
| 6,599,655 B2 | * | 7/2003 | Johnson et al. | 429/50 |
| 6,789,026 B2 | * | 9/2004 | Barsoukov et al. | 702/63 |
| 7,564,217 B2 | * | 7/2009 | Tanigawa et al. | 320/118 |
| 2003/0222619 A1 | * | 12/2003 | Formenti et al. | 320/119 |

FOREIGN PATENT DOCUMENTS

| | | |
|---|---|---|
| DE | 195 41 959 A1 | 5/1996 |
| EP | 1 498 999 A2 | 1/2005 |
| JP | 11-285161 | 10/1999 |
| JP | 2000-14035 | 1/2000 |
| JP | 2001-314046 | 11/2001 |
| JP | 2001314046 A * | 11/2001 |
| JP | 2002-238179 | 8/2002 |
| JP | 2002238179 A * | 8/2002 |
| JP | 2003-274570 | 9/2003 |
| JP | 2005-51938 | 2/2005 |
| JP | 2005-158285 | 6/2005 |
| JP | 2005-243455 | 9/2005 |
| JP | 2005-317512 | 11/2005 |
| JP | 2005-318790 | 11/2005 |

* cited by examiner

*Primary Examiner*—Edward Tso
*Assistant Examiner*—Samuel Berhanu
(74) *Attorney, Agent, or Firm*—Oblon, Spivak, McClelland, Maier & Neustadt, L.L.P.

(57) ABSTRACT

A battery module system includes a battery module and a control member. The battery module comprises battery units are connected in series. Each of the battery units comprises a unit cell having a voltage variation rate A (mV/% SOC) at a full charge voltage $V_{H1}$ (V) is larger than 20 (mV/% SOC), which is a value obtained when the unit cell is charged at a current of 1 C at 25° C. The control member controls current to a current $I_1$ until a maximum value $V_{max}$ (V) among the voltage of each unit cell reaches the full charge voltage $V_{H1}$ (V) and then controls a voltage of the battery module to a voltage V2 (V) given by the following equation (1):

$$V2 = V_{H2} \times n \quad (1).$$

20 Claims, 14 Drawing Sheets

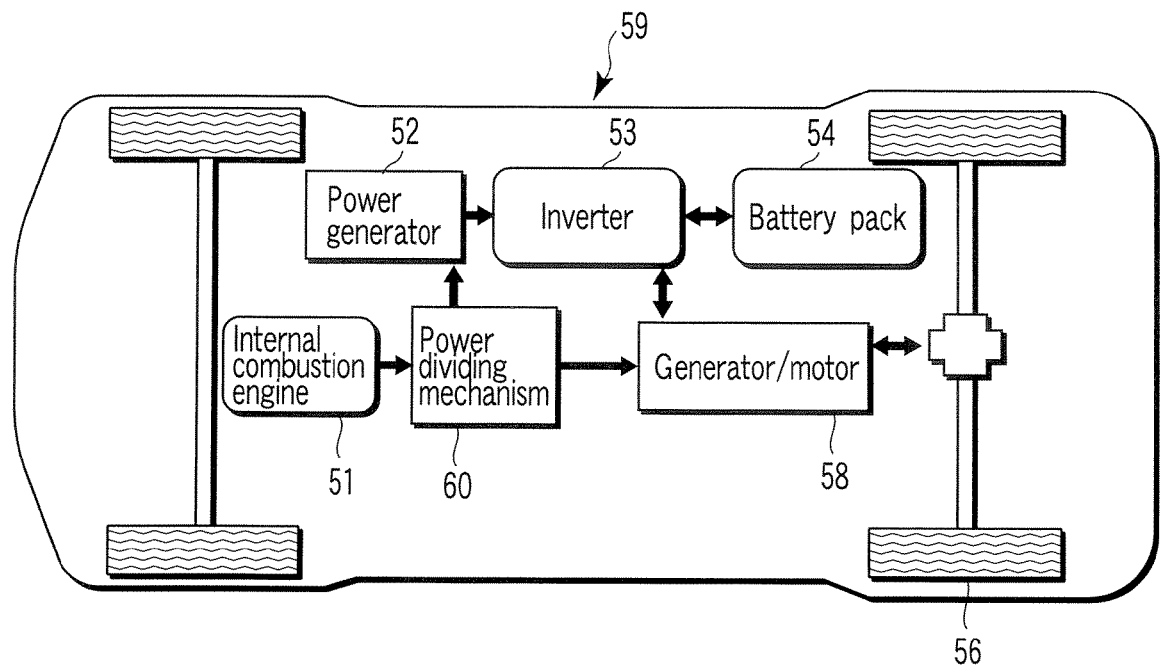
F I G. 12
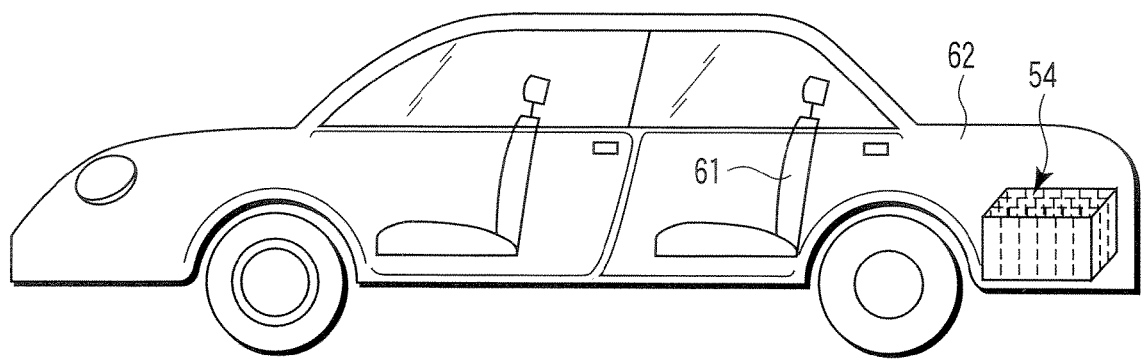
F I G. 13

BATTERY MODULE SYSTEM, METHOD OF CHARGING BATTERY MODULE AND CHARGING TYPE VACUUM CLEANER

CROSS-REFERENCE TO RELATED APPLICATIONS

This application is based upon and claims the benefit of priority from prior Japanese Patent Application No. 2006-096001, filed Mar. 30, 2006, the entire contents of which are incorporated herein by reference.

BACKGROUND OF THE INVENTION

1. Field of the Invention

The present invention relates to a battery module system, a charging type vacuum cleaner using the battery module system and a method of charging the battery module.

2. Description of the Related Art

Secondary batteries having high energy densities are developed and utilized as power sources for miniature information devices such as cellular telephones and portable personal computers (PCs). These secondary batteries are used in such a manner that the number of secondary batteries (unit cell) constituting a battery module and the way of combining series-connection and parallel-connection are varied according to voltage and current required for each device. Because the power source voltage of the above miniature portable devices is about several volts to 10 volts, a secondary battery is singly used or about 2 to 3 series of batteries are mostly used even if a battery module is used in which plural secondary batteries are connected in series. However, in recent years, the applications of secondary batteries are not confined to information devices but have been rapidly spread towards high-power and high-voltage fields such as domestic electric appliances, power tools, electric mopeds and hybrid cars. Along with this, the number of series in a battery module is increased and it is no rare case that 10 or more secondary batteries are connected in series upon use.

A problem arising when batteries are connected in series is variations between unit cells. The variation involves those observed from various viewpoints such as variations in capacity, impedance and SOC (state of charging). There are variations in voltage in a full charge state as a problem leading, particularly, to disorders. When batteries different in capacity are connected in series or in the condition that the SOCs (state of charging) of them are deviated from each other, unit cells having a voltage higher than the average and unit cells having a voltage lower than the average arise in a full-charged condition of the battery module, the unit cell having high voltage is put into a an overcharged state and is resultantly deteriorated greatly. If such charging is repeated, the unit cell that is largely deteriorated by the overcharging is reduced in capacity and is further overcharged, so that the progress of the deterioration of the unit cell is accelerated. As a result, this gives rise to the problem that the cycle life of the battery module is shortened more significantly than the unit cell.

To deal such a problem, a method is usually adopted in which charging called electrical reconditioning is carried out to eliminate variations in voltage in a charged state in a battery module of a nickel metal-hydride battery. The nickel metal-hydride battery has the performance that if it is intended to further charge a nickel metal-hydride battery in a state close to a full charge state, a charging reaction of the electrode material and a decomposition/regeneration reaction of the water in the electrolytic solution compete with each other, so that the charge reaction does not proceed. Therefore, if over-charging is carried out in such a proper charging condition as to prevent deterioration in the performance of the battery, the charging voltages of the batteries connected in series can be uniformed by utilizing an electrochemical current bypass function of the battery. There are many known examples of such an electrical reconditioning method, for example, JP-A 2001-314046 (KOKAI).

Generally, the coulomb efficiency of charging and discharging is almost 100% in secondary batteries and capacitors using a nonaqueous electrolyte and therefore, unlike the nickel metal-hydride battery, the current bypass function by the battery cannot be expected. To deal with such a case, a method is proposed in which an equalizing circuit in which each cell is bypassed is disposed as an external circuit to bypass charging current for unit cells charged to voltages exceeding a predetermined value, thereby suppressing variations in charge voltage. For example, JP-A 2002-238179 (KOKAI) discloses such technologies that in a battery module provided with plural unit cells connected in series, a Zener diode is connected to each unit cell in parallel to bypass charging current for unit cells charged to voltages exceeding the Zener voltage.

However, even if such a method is adopted, it is difficult to efficiently eliminate variations in the charged voltage of a unit cell because of the following problems. First, in the case of intending to attain the necessary function by a single element such as a Zener diode, the charge voltage of the battery is governed by variations in Zener voltage. It is difficult to suppress variations in Zener voltage like the case of producing a battery reduced in variation. The rise of Zener current when the charge voltage reaches the Zener voltage is by no means steep and therefore, bypass current starts flowing at a voltage lower than the required charge voltage. It is thus difficult to apply this method to a secondary battery for which the voltage must be controlled on the order of several tens of millivolts. To mention other problems, when the capacity of a battery module is large or the charge current is large in the case of, for example, carrying out rapid charging, power consumption in a Zener diode is increased, which makes it difficult to actually practice this method due to problems such as heat generation. In order to evade problems such as those mentioned above, the bypass circuit is constituted not by a single element such as a Zener diode but by a bypass circuit which comprises standard voltage and feedback control and to which a large-current switching element is applied, which makes it possible to put this method into practice on principle. However, actually, if the number of series of cells in the battery module is large, the circuit is complicated and also, the size and cost are made to be too large for a battery module, which makes it difficult to realize this circuit.

When the above bypass control circuit is made collectively into a compact form using ICs, this circuit may be applied to even a battery module increased in the number of series. On the other hand, such a bypass circuit does not allow large bypass currents to flow, and therefore only very slow equalizing control is permitted. When, particularly, unit cells having the large voltage variation rate with the capacity in the vicinity of full charge voltage are used, variations in voltage is rapidly increased with the progress of charging, which excessively increase the bypass current required to expect that the bypass will restrict the variation in voltage. It is therefore very difficult to restrict variations in the charge voltage of unit cells only by a bypass circuit.

BRIEF SUMMARY OF THE INVENTION

According to a first aspect of the present invention, there is provided a battery module system comprising:

a battery module comprising battery units are connected in series, each of the battery units comprising a unit cell having a voltage variation rate A (mV/% SOC) at a full charge voltage $V_{H1}$ (V) is larger than 20 (mV/% SOC), which is a value obtained when the unit cell is charged at a current of 1 C at 25° C.;

a current supply member which supplies current to the battery module;

a voltage detecting member which detects a voltage of the unit cells; and a control member which controls the current to a current $I_1$ until a maximum value $V_{max}$ (V) among the voltage of each unit cell reaches the full charge voltage $V_{H1}$ (V) and then controls a voltage of the battery module to a voltage V2 (V) given by the following equation (1):

$$V2 = V_{H2} \times n \quad (1)$$

where $V_{H2}$ is a voltage lower than a voltage $V_{M1}$ of the unit cell when the voltage variation rate A (mV/% SOC) reaches 20 (mV/% SOC) from less than 20 (mV/% SOC) and n denotes the number of battery units connected in series.

According to a second aspect of the present invention, there is provided a method of charging a battery module comprising battery units are connected in series, each of battery units comprising a unit cell having a voltage variation rate A (mV/% SOC) at a full charge voltage $V_{H1}$ (V) is larger than 20 (mV/% SOC), which is a value obtained when the unit cell is charged at a current of 1 C at 25° C., the method comprising:

a first constant-current charging at a current $I_1$ until a maximum value $V_{max}$ (V) among the voltage of each unit cell reaches the full charge voltage $V_{H1}$ (V); and a first constant-voltage charging which controls a voltage of the battery module to a voltage V2 given by the following equation (1):

$$V2 = V_{H2} \times n \quad (1)$$

where $V_{H2}$ is a voltage lower than a voltage $V_{M1}$ of the unit cell when the voltage variation rate A (mV/% SOC) reaches 20 (mV/% SOC) from less than 20 (mV/% SOC) and n denotes the number of battery units connected in series.

BRIEF DESCRIPTION OF THE SEVERAL VIEWS OF THE DRAWING

FIG. 12 is a typical view showing a series/parallel hybrid car according to the third embodiment;

FIG. 13 is a typical view showing a car according to the third embodiment;

DETAILED DESCRIPTION OF THE INVENTION

Embodiments of the present invention will be explained with reference to the drawings. Structures common throughout these embodiments are represented by the same symbols and duplicated explanations are omitted. Also, each view is a typical view for explaining the invention and accelerating the understanding of the invention. Though there are parts having a shape, dimension, ratio and the like different from those of an actual device, designs of these parts may be properly modified in consideration of the following explanations and known technologies.

First Embodiment

A method of charging a battery module according to a first embodiment will be explained.

The battery module is formed by connecting plural battery units in series. Each of the battery units comprises at least one unit cell. When the battery unit comprises plural unit cells, it is desirable to form one battery unit by connecting unit cells in parallel.

Figure 1:
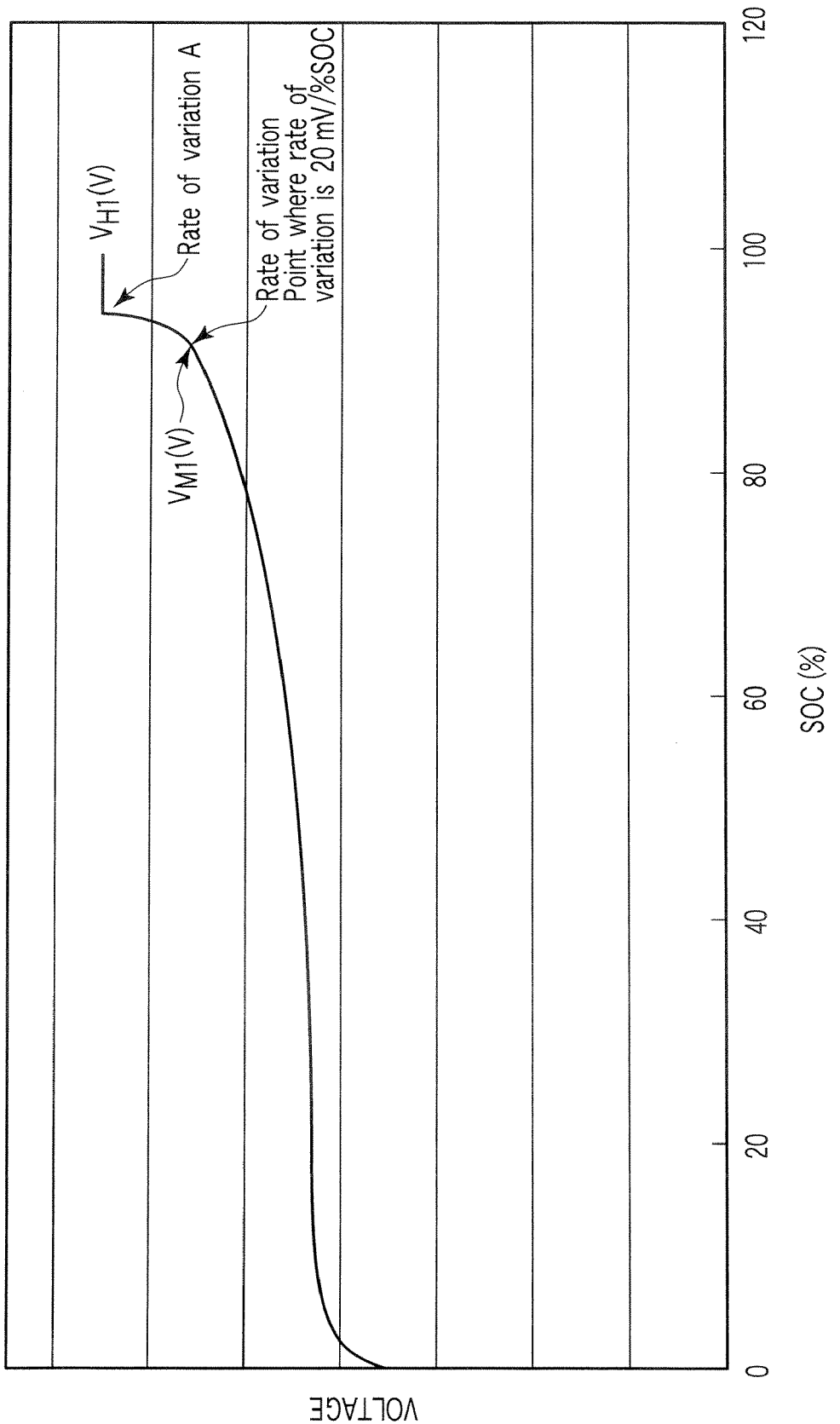
FIG. 1 a characteristic view showing one example of a charge curve when a nonaqueous electrolyte secondary battery used as a unit cell is charged at a current of 1 C at 25° C. by using a method of charging a battery module according to a first embodiment.

FIG. 1 shows one example of a charge curve when a nonaqueous electrolyte secondary battery used as a unit cell is charged at a current of 1 C at 25° C. by using a method of charging a battery module according to the first embodiment. Here, 1 C is the current required to discharge a unit cell in one hour and the value of the nominal capacity of a unit cell may be used as the 1 C current for the sake of convenience. In FIG. 1, the abscissa shows the state of charging (SOC) of the nonaqueous electrolyte secondary battery and the ordinate shows the voltage (closed circuit voltage) of the nonaqueous electrolyte secondary battery. The above SOC is a ratio of the charge capacity of a unit cell to the full charge capacity. As the full charge capacity, the nominal capacity of the unit cell is used. As shown in FIG. 1, the voltage variation rate A (voltage: closed circuit voltage) as a function of SOC at the time of a full charge voltage $V_{H1}$ (V) is a value larger than 20 (mV/% SOC). The voltage variation rate A is obtained by a charge curve when the battery is charged at a current of 1 C at 25° C. When the voltage variation rate A is, for example, 100 (mV/% SOC), a variation in voltage is 100 mV if a variation in SOC in the vicinity of the full charge point is 1%. Therefore, if the battery module is controlled at constant voltage and constant current, a unit cell having a voltage higher than the control voltage easily falls into an overcharge state and is significantly deteriorated resultantly. Here, the voltage variation rate A is a differential value obtained by differentiating the voltage by the SOC at one point of the curve showing the relation between the SOC and the battery voltage. In other words, on the charge curve representing a SOC vs voltage characteristic, the inclination at a point on the curve is the voltage variation rate A. Here, when the unit of SOC is set to (%) and the unit of the battery voltage is set to (mV), the unit of the voltage variation rate A is noted by (mV/% SOC).

As a first charging step, a first constant-current charging is carried out. Each unit cell is charged at a constant charge current $I_1$ which is optionally set until the maximum value $V_{max}$ (V) among the voltage of each unit cell reaches $V_{H1}$ (V). Usually, a battery module of nonaqueous electrolyte secondary battery has the function of monitoring the voltage of each unit cell for ensuring safety. It is therefore relatively easy to detect that the maximum voltage of a unit cell reaches a predetermined value. If the first charging step is finished at this point in time, there is no unit cell overcharged in the first charging step. If charge current in the first charging step is relatively small, it is possible that a unit cell charges up to the capacity close to the nominal capacity of the unit cell if charging time is made longer. However, in the case where large charge current is used as in the case of charging rapidly, the capacity which can be charged in the first charging step is much smaller than the nominal capacity and the charging cannot be completed only by the first charging step. It is preferable that the charge current $I_1$ in the first charging step be designed such that the charging time in which the SOC of the battery module reaches 80% from 0% is within 20 minutes. Specifically, the charge current is preferably designed to be 5 C or more, and more preferably 10 C or more. In the case where the SOCs of the unit cells constituting the battery module are not the same but are uneven, the SOC of the battery module is set to the lowest SOC among the SOCs of the unit cells constituting the battery module. In this case, the charging time in which the SOC of the battery module reaches 80% from 0% means the charging time required until the lowest SOC among the SOCs of the unit cells constituting the battery module reaches 80%.

As a second charging step, a first constant voltage charging is carried out wherein the voltage of the battery module is controlled to a voltage V2 (V) given by the following equation (1).

$$V2 = V_{H2} \times n \qquad (1)$$

In the above equation, $V_{H2}$ is a voltage (V) lower than the voltage $V_{M1}$ of the above unit cell when the above voltage variation rate A (mV/% SOC) reaches 20 (mV/% SOC) from less than 20 (mV/% SOC) and n denotes the number of battery units connected in series.

At this time, the battery module is charged at a constant voltage lower than $V_{M1}$ (V) per one unit cell. When the voltage of the unit cell is lower than $V_{M1}$ (V), the voltage variation rate A as the function of the SOC of the unit cell is lower than 20 (mV/% SOC). Therefore, even if the variation in SOC is 5%, the variation in voltage is limited to lower than 100 mV. Also, since the voltage of the unit cell is set to a voltage lower than $V_{M1}$ (V), the voltage of the unit cell does not exceed the full charge voltage $V_{H1}$ (V), so that the unit cell is not overcharged even if the voltage of the unit cell varies. Moreover, since the voltage of the unit cell is set to a voltage lower than $V_{M1}$ (V), the charge current is smaller than $I_1$, even if the charge current is not particularly limited and damages to the charger and battery can be reduced.

Also, in the second charging step, a second constant-current charging wherein the current is controlled to a value $I_2$ lower than $I_1$ ($I_2 < I_1$) may be carried out prior to the first constant-voltage charging. This makes it possible to further reduce variations in the voltages of unit cells in the last stage of the charging and it is therefore possible to more improve the cycle performance of the battery module.

Even in the case of omitting the first charging step and charging only in the second charging step, it is possible to charge with suppressed variations in the voltage of the unit cell. However, the first charging step can be carried out using a larger current than that of the second charging step and thus the charging can be carried out more rapidly in a shorter time when the first charging step is provided. The first constant-voltage charging in the second charging step may be set to an optional value lower than $V_{M1}$, and as the constant voltage is smaller, the variation in unit cell voltage can be limited to a smaller value. If the constant voltage is too small on the contrary, the capacity to be charged is smaller, which is undesirable. It is preferable to design the voltage V2 such that the SOC of the battery module when the second charging step is finished reaches the range of 70 to 98% when the SOC of the battery module at the full charge voltage $V_{H1}$ was set to 100%. In the case where variations exist among the SOCs of the unit cells constituting the battery module, the lowest SOC among these SOCs is the SOC of the battery module. In this case, when the lowest SOC among the SOCs of the unit cells constituting the battery module reaches 70 to 98%, it may be said that the SOC of the battery module reaches 70 to 98%.

Further, a third charging step may be carried out as needed. In the third charging step, a third constant-current charging is carried out at a current of 3 C or less and a second constant-voltage charging is carried out wherein the voltage of the battery module is controlled to a voltage not higher than a voltage $V_{H3}$ (V) given by the following equation (2).

$$V_{H3} = V_{H1} \times n \qquad (2)$$

In the above equation, $V_{H1}$ is the above full charge voltage (V) and n denotes the number of the battery units connected in series.

The method in which constant-voltage/constant-current charging is carried out at $V_{H1} \times n$ (V) is a usual charging method. When the charging proceeds through the first and second charging steps prior to the third step and the constant current is limited to a value as small as 3 C or less in accordance with the rapid charging performance of the battery, the charge of the battery can be made to be close to the full charge while suppressing variations in the voltages of the unit cells. Therefore, the initial capacity of the battery module can be more improved.

Second Embodiment

One example of a battery module system according to a second embodiment of the present invention will be explained in detail.

Figure 2:
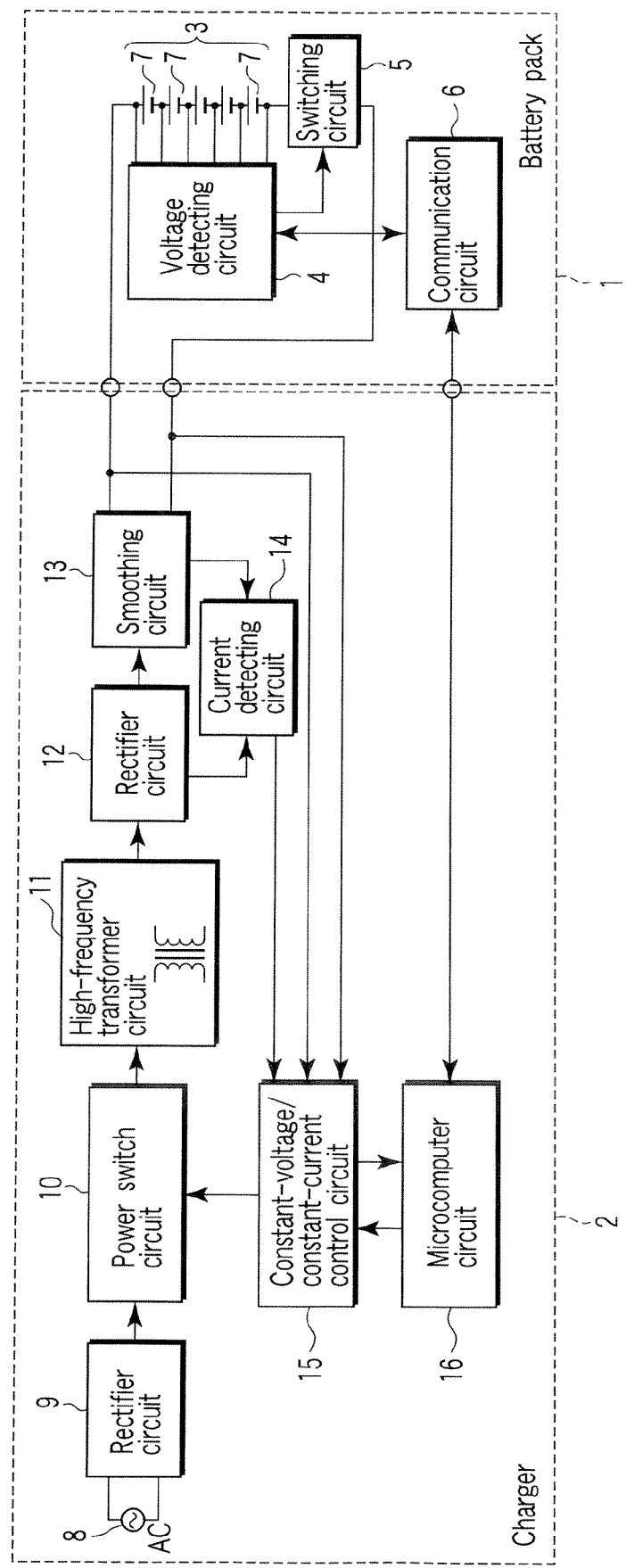
FIG. 2 is a block diagram showing one example of a battery module system according to a second embodiment.

FIG. 2 is an example of the block diagram of a battery module system according to the second embodiment of the present invention. The battery module system comprises a battery pack 1 and a charger 2. The battery pack 1 comprises a battery module 3 and a protective circuit. The protective circuit contains a voltage detecting circuit 4, a switching circuit (SW circuit) 5 and a communication circuit 6. The battery module 3 comprises plural battery units 7 constituted of a unit cell connected in series. As the unit cell, a nonaqueous electrolyte secondary battery is used. Although the number of series is 5 in FIG. 2, this number may be 2 or more and optional. However, if the number of series is too large, it is difficult to detect the voltage using one voltage detecting circuit and therefore, the circuit is complicated. Therefore, the number of series is usually about 2 to 20 and it is preferable to select the number which makes it possible to obtain the required voltage of the battery module.

Although, in FIG. 2, the battery unit 7 is constituted of one unit cell, plural unit cells may be connected in parallel to constitute the battery unit. In this case, the battery module is one including both of the parallel connection and the series connection. The voltage detecting circuit 4 as the voltage detecting member is connected to each connecting point among the battery units 7 so as to be able to measure the voltages of all unit cells contained in the battery pack 1. However, when the battery module contains parallel connection, the parallel group has the same voltage and therefore, it is only required to measure the voltage at one position per one parallel group. The voltages of the measured unit cells are compared to send, to the communication circuit 6, a signal as to whether or not the value showing the maximum value reaches the predetermined voltage. The communication circuit 6 sends the signal to the charger. The content of the signal to be sent is not limited to the information as to whether or not the value showing the maximum value reaches the predetermined voltage but the voltage itself may be sent. Because different predetermined voltages exist in plural charging steps, they are preferably set using the same communicating circuit existed in the outside. The voltage detecting circuit 4 contained in the battery pack not only is utilized for charge control but also, as one of its purposes, originally prevents overcharge of a battery in the case of disorders of a battery and defects of a charger. Therefore, the switching circuit 5 cutting charge or discharge current in such a case is inserted into a current path and is controlled by the voltage detecting circuit 4. The voltage detecting circuit 4 may have a circuit structure containing no microcomputer circuit if it only serves to monitor the maximum voltage of each unit cell to compare this value with the predetermined voltage. However, the voltage detecting circuit 4 may contain a microcomputer circuit in order to cope with the setting from the outside.

The charger 2 converts AC current into DC current having the voltage and current required to charge the battery pack in a converting section containing a rectifier circuit 9 connected to AC power source 8, a power switching circuit 10, a high frequency transformer circuit 11, a rectifier circuit 12 and a smoothing circuit 13 to supply charge current to the battery module of the battery pack. Specifically, a current supply member comprises the rectifier circuit 9, the power switching circuit 10, the high frequency transformer circuit 11, the rectifier circuit 12 and the smoothing circuit 13. Though the AC power source 8 may be contained in the charger 2 as shown in FIG. 2, it may be disposed outside the charger 2. The current and voltage of the output of the current supply member are detected and controlled using a feedback control, by a current detecting members. The current detecting members comprises a current detecting circuit 14 and a constant-voltage/constant-current control circuit 15. A microcomputer circuit 16 provides a constant voltage value and a constant current value to the constant-voltage/constant-current control circuit 15 according to each charging step. Also, the microcomputer circuit 16 receives the signals from the battery pack 1 and makes judgment as to the voltage of the unit cell to control the charging step. In this embodiment, a circuit provided with the above constant-voltage/constant-current control circuit 15 and the microcomputer circuit 16 is called a control member.

Figure 3:
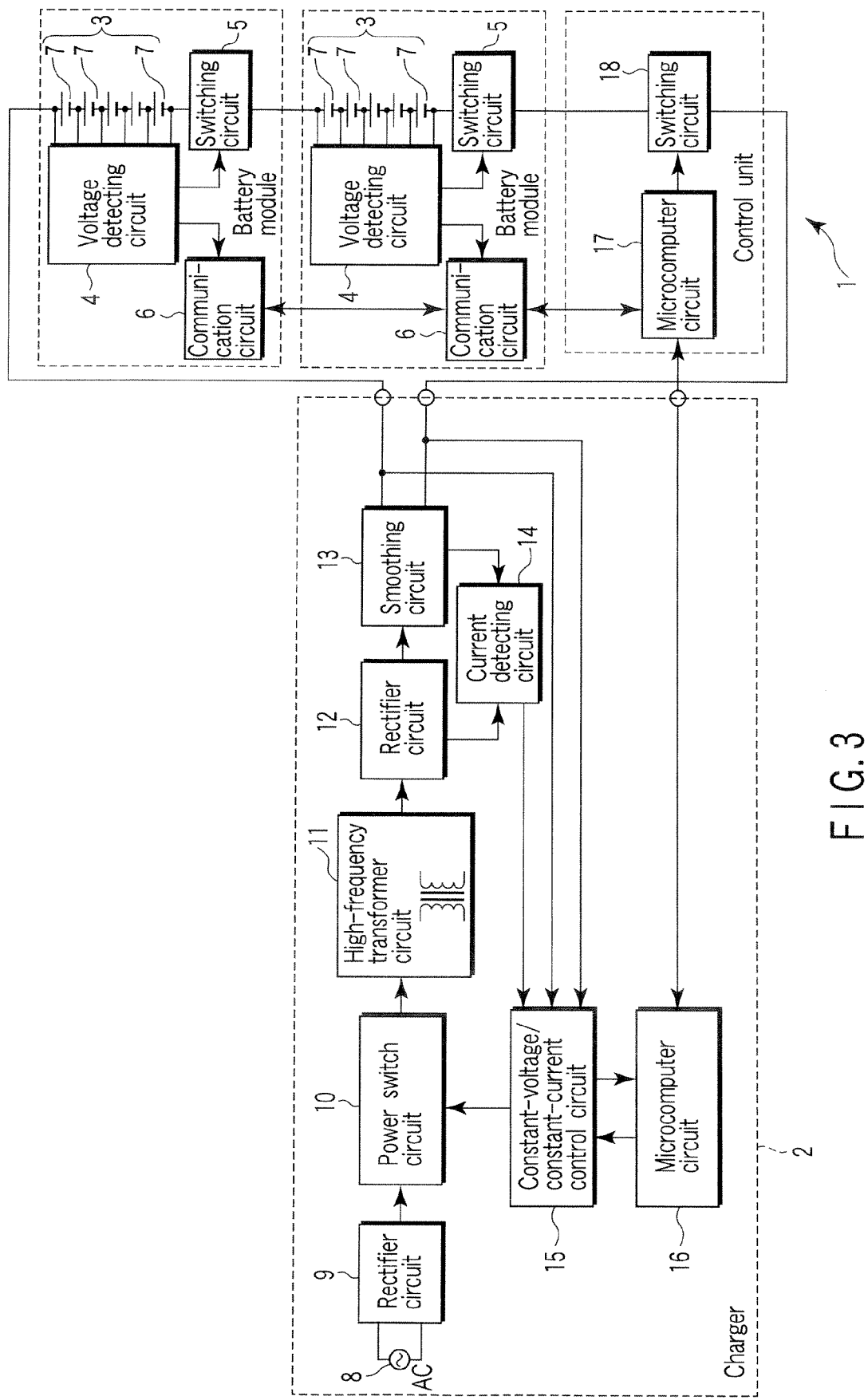
FIG. 3 is a block diagram showing another example of the battery module system according to the second embodiment.

FIG. 3 is another example of a block diagram of the battery module system according to the second embodiment of the present invention. The battery module comprising a battery module, the voltage detecting circuit 4, the switching circuit 5 and the communication circuit 6 has the same structure as the above battery pack. An optional number of the battery modules are connected in series to obtain high voltage. The communication circuits 6 of the battery module are connected with each other and the information of each of the communication circuit 6 is united. Then, in a microcomputer circuit 17, for example, the maximum voltages of the unit cells in all battery modules are monitored. Also, the switching circuit 5 in each battery module is usually kept on and a separately prepared switching circuit 18 having high operating voltage is controlled to inhibit overcharge.

The charger is separated from the battery pack for the sake of convenience in the above explanations. This is only an example in which the charger is separated from the battery pack based on the idea that it is reasonable that the both are separated functionally when the present invention is practiced. Basically, the present invention can be practiced if the voltage of the unit cell is detected and based on this, the charge voltage and current can be controlled. In the present invention, the structures of the battery pack and charger are not limited to the above examples.

Figure 4:
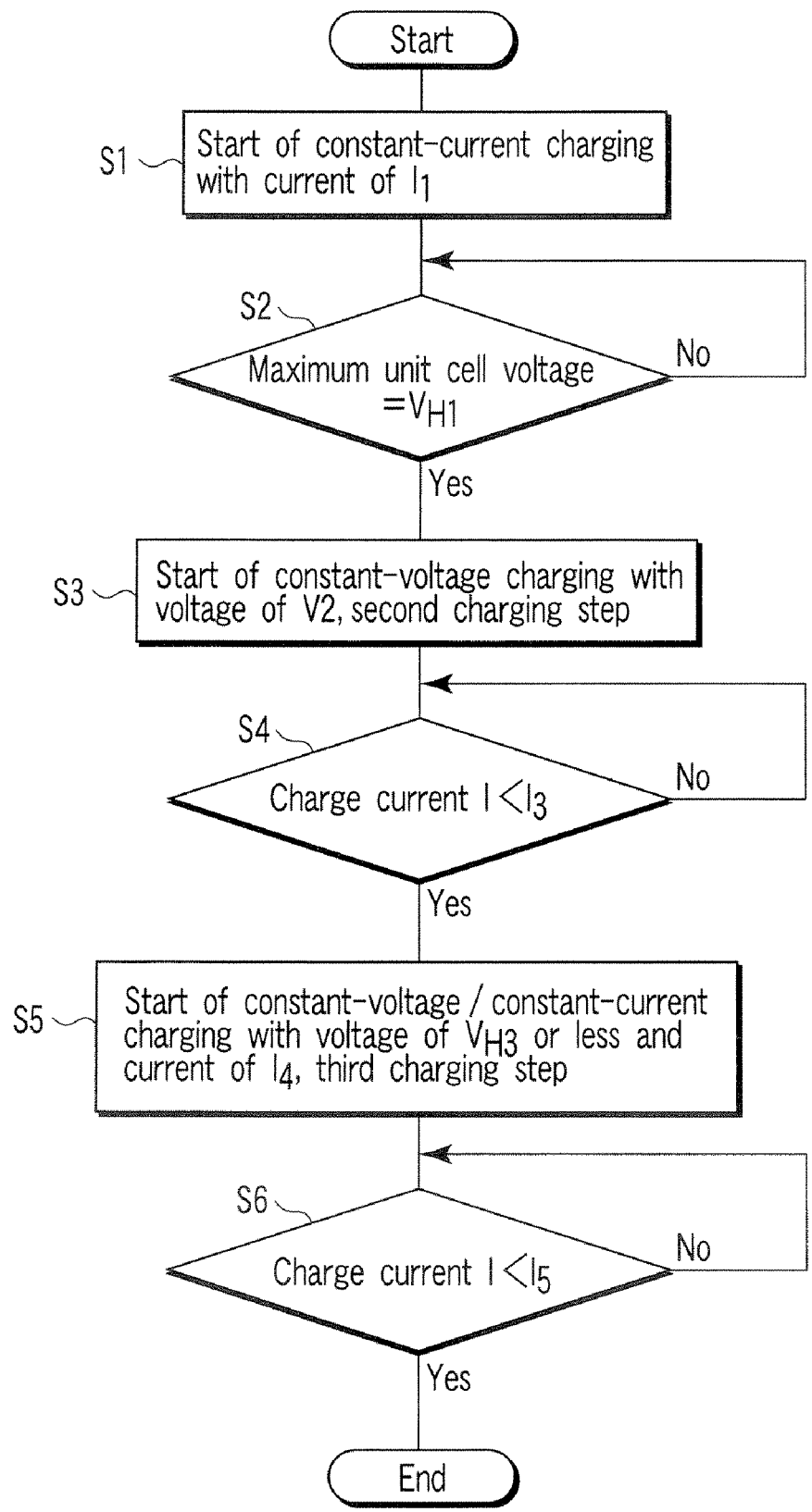
FIG. 4 is a flowchart showing a control flow to charge using a charging method according to the first embodiment and the battery module system according to the second embodiment.

FIG. 4 is a control flowchart for explaining a process of charging by the charging method according to the first embodiment and the battery module system according to the second embodiment.

First, in step S1, the first charging step is started to carry out the first constant-current charging at a current $I_1$. The microcomputer circuit 16 gives a constant current value in the first charging step to the constant-voltage/constant-current control circuit 15. The current and voltage of the output of the current supply member are detected by the current detecting circuit 14 and the constant-voltage/constant-current control circuit 15 under feedback control to carry out the first constant-current charging.

In step S2, the maximum voltage among the voltages of the unit cells constituting the battery module is monitored. When the maximum voltage exceeds $V_{H1}$, the first charging step is finished. In the microcomputer circuit 16, charge control data determined from the data of a charge curve obtained when the unit cell is carried out constant-current charging at a current of 1 C at 25° C. is stored in advance. This data is given to the voltage detecting circuit 4. The voltage detecting circuit 4 compares the maximum value among the detected voltages of the unit cells with the full charge voltage $V_{H1}$ (V) based on the charge control data to send signals to the communication circuit 6 when the maximum value reaches the full charge voltage $V_{H1}$ (V). The communication circuit 6 sends signals to the microcomputer circuit 16 of the charger. As a result, the first charging step is finished.

In step S3, the second charging step is started to carry out the first constant-voltage charging at a constant voltage V2 shown in the aforementioned equation (1). It is to be noted that the constant voltage V2 is determined by the microcomputer circuit 16 and the determined value is given to the constant-voltage/constant current control circuit 15.

In step S4, conditional branching as to whether to terminate the second charging step or not is carried out. When in the first constant-voltage charging in the second charging step, the current is reduced to smaller than $I_3$, the second charging step is finished. Specifically, the constant-voltage/constant-current control circuit 15 compares $I_3$ stored as the data with the current detected by the current detecting circuit 14 and sends signals to the microcomputer circuit 16 when the current reaches $I_3$, whereby the second charging step is terminated. Though the current $I_3$ may be determined optionally, it is properly 1/20 or more and 1/5 or less of the current corresponding to 1 C.

As to the conditional branching in step S4, the process may be untransferred by the judgment based on a reduction in current but may be simply transferred to the next step after a predetermined period of time passes.

Step S5 is an example for carrying out the third charging step, in which constant-voltage/constant-current charging is carried out at a voltage not higher than the voltage $V_{H3}$ shown by the above equation (2) at a current $I_4$. $I_4$ may be designed to be a value equal to or lower than the current corresponding to 3 C. It is however preferable that the $I_4$ be designed to be 0.2 C to 1 C by, for example, the impedance of the battery.

In step S6, conditional branching as to whether to terminate the third charging step or not is carried out. In the constant-voltage/constant-current charging in the third charging step, the third charging step is terminated if the current is reduced to less than $I_5$ after the charging mode is transferred to constant-voltage charging. Specifically, the constant-voltage/constant-current control circuit 15 compares $I_5$ stored as the data with the current detected by the current detecting circuit 14 and sends signals to the microcomputer circuit 16 when the current reaches $I_5$, whereby the third charging step is terminated. Though the current $I_5$ may be determined optionally, it is properly 1/40 or more and 1/10 or less of the current corresponding to 1 C. As to the conditional branching in step S6, the process may be untransferred by the judgment based on a reduction in current but may be simply transferred to the next step after a predetermined period of time passes.

Figure 5:
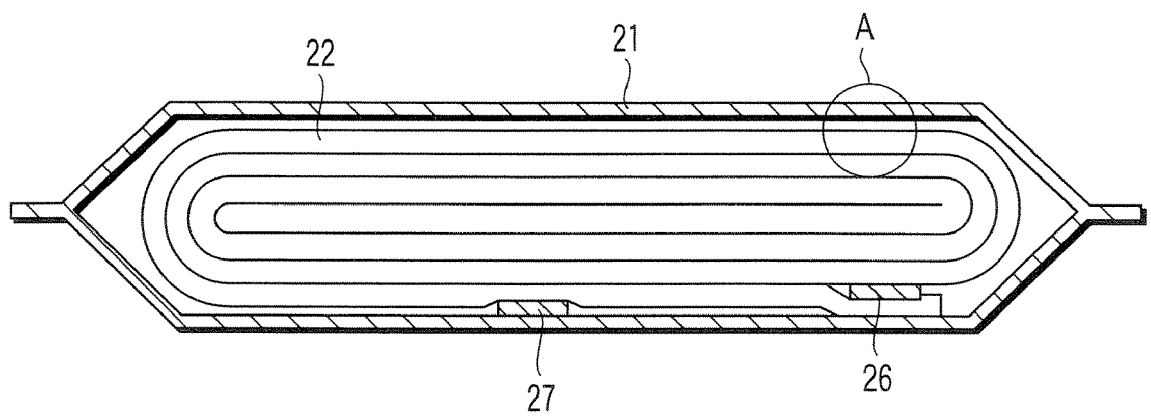
FIG. 5 is a sectional view typically showing one example of a flat type nonaqueous electrolyte secondary battery.
Figure 6:
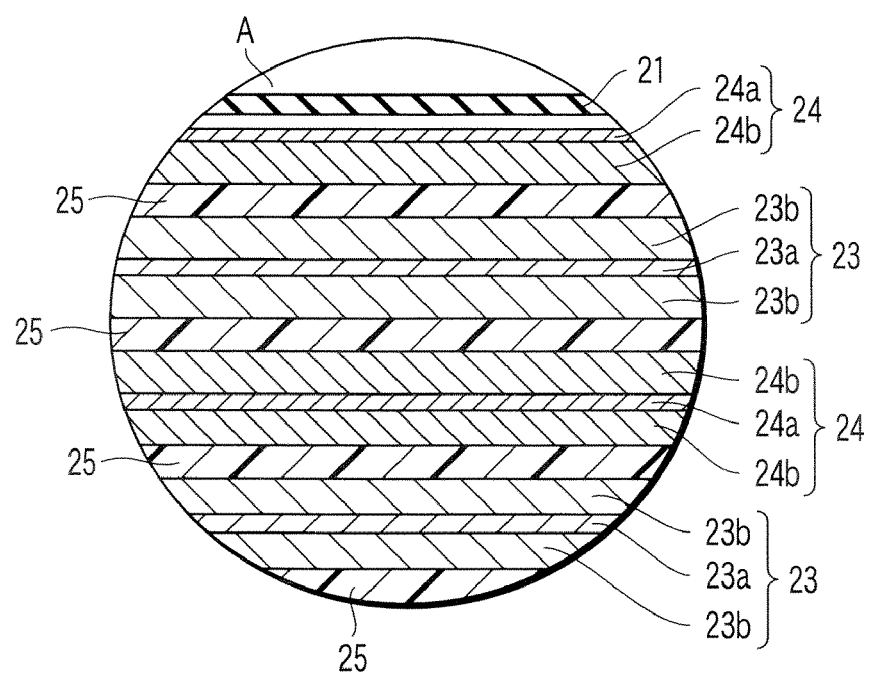
FIG. 6 is an enlarged sectional view showing the part A of FIG. 5.

The nonaqueous electrolyte secondary battery to be used as the unit cell will be explained with reference to FIGS. 5 and 6. FIG. 5 is a sectional view showing a lithium ion secondary battery that is one example of the nonaqueous electrolyte secondary battery. FIG. 6 is an enlarged sectional view showing the part A of FIG. 5.

As shown in FIG. 5, an electrode group 22 is accommodated in a case 21 made of a film. The electrode group 22 has a structure in which a positive electrode 23 and a negative electrode 24 are coiled flat-wise through a separator 25. As shown in FIG. 6, the positive electrode 23 includes a positive electrode current collector 23a and a positive electrode active material-containing layer 23b formed on at least one surface of the positive electrode current collector 23a. The negative electrode 24 includes a negative electrode current collector 24a and a negative electrode active material-containing layer 24b formed on at least one surface of the negative electrode current collector 24a. The separator 25 is interposed between the positive electrode active material-containing layer 23b and the negative electrode active material-containing layer 24b.

A band-like positive electrode terminal 26 is connected to the positive electrode current collector 23a of the electrode group 22 and its end is drawn out of the case 21. A band-like negative electrode terminal 27 is connected to the negative electrode current collector 24a of the electrode group 22 and its end is drawn out of the case 21. The positive electrode terminal 26 and the negative electrode terminal 27 are drawn out of the same side of the case 21, and the directions in which the positive electrode terminal 26 and the negative electrode terminal 27 are drawn are the same.

The positive electrode, the negative electrode, the separator, the nonaqueous electrolyte and the case will be explained.

1) Negative Electrode

The above negative electrode is manufactured by applying a negative electrode material paste, obtained by dispersing, for example, a negative electrode active material, an electrically conductive agent and a binder in a proper solvent, to one or both surfaces of the current collector.

Examples of the above negative electrode active material include carbonaceous materials which absorb and desorb lithium ions, metal oxides, metal sulfides, metal nitrides, alloys and light metals.

Examples of the above carbonaceous materials which absorb and desorb lithium ions may include cokes, carbon fibers, heat-decomposed vapor phase carbon materials, graphite, resin sintered bodies and sintered bodies of mesophase pitch type carbon fiber or mesophase spherical carbon. If, among these materials, mesophase pitch type carbon fibers or mesophase spherical carbons which are graphitized at 2500° C. or more are used, this is preferable because high electrode capacity is obtained.

Examples of the metal oxides include titanium-containing metal composite oxides, for example, tin type oxides such as $SnB_{0.4}P_{0.6}O_{3.1}$ and $SnSiO_3$, silicon type oxides such as SiO and tungsten type oxides such as $WO_3$. If, among these metal oxides, negative electrode active materials, for example, titanium-containing metal composite oxides such as lithium titanate, having a redox potential higher by 0.5 V or more than metal lithium are used, this is preferable because even in the case of charging the battery rapidly, no lithium dendrite is generated on the negative electrode, leading to reduced deterioration of the battery.

Examples of the titanium-containing metal composite oxide may include titanium-based oxides containing no lithium when each oxide is synthesized, lithium-titanium oxide and lithium-titanium composite oxides obtained by substituting a part of the structural elements of lithium-titanium oxides with foreign elements. Examples of the lithium-titanium oxide may include lithium titanate having a spinel structure (for example, $Li_{4+x}Ti_5O_{12}$ (x is a value which is varied by charging or discharging, $0 \leq x \leq 3$)) and ramsdellite type lithium titanate (for example, $Li_{2+y}Ti_3O_7$ (y is a value which is varied by charging or discharging, $0 \leq y \leq 3$)).

The titanium-based oxide noted above includes, for example, $TiO_2$ and a metal composite oxide containing Ti and at least one element selected from the group consisting of P, V, Sn, Cu, Ni, Co and Fe. It is desirable for $TiO_2$ to be of anatase type and to have a low crystallinity caused by a heat treating temperature of 300 to 500° C. The metal composite oxide containing Ti and at least one element selected from the group consisting of P, V, Sn, Cu, Ni, Co and Fe includes, for example, $TiO_2$—$P_2O_5$, $TiO_2$—$V_2O_5$, $TiO_2$—$P_2O_5$—$SnO_2$, and $TiO_2$—$P_2O_5$—MeO (Me denoting at least one element selected from the group consisting of Cu, Ni, Co and Fe). To be more specific, it is desirable for the micro structure of the metal composite oxide to include a crystal phase and an amorphous phase or a single phase formed of an amorphous phase. The particular micro structure makes it possible to improve markedly the charge-discharge cycle performance of the nonaqueous electrolyte battery. Particularly, it is desirable to use lithium-titanium oxide and a metal composite oxide containing Ti and at least one element selected from the group consisting of P, V, Sn, Cu, Ni, Co and Fe.

The metal sulfides include, for example, titanium sulfide ($TiS_2$), molybdenum sulfide ($MOS_2$), and iron sulfides (FeS, $FeS_2$, $Li_xFeS_2$). Also, the metal nitride includes, for example, lithium-cobalt nitride ($Li_xCo_yN$, $0<x<4$, $0<y<0.5$).

As the negative electrode active material, it is preferable to use lithium titanate having a spinel structure. In this case, it is preferable to use any one of a lithium-cobalt composite oxide, lithium-nickel-cobalt composite oxide and lithium-nickel-cobalt-manganese composite oxide as the positive electrode active material. In the case of the nonaqueous electrolyte secondary battery using such a positive electrode active material and a negative electrode active material, the voltage variation rate A as the function of SOC is larger than 20 (mV/% SOC). The voltage variation rate A is obtained by a charge curve when the unit cell is charged at a current of 1 C at 25° C. and the charge voltage reaches a full charge voltage $V_{H1}$ (V). It is to be noted that the nonaqueous electrolyte secondary battery showing the above charging curve may also be attained using a carbonaceous material as the negative electrode active material and a lithium-manganese composite oxide as the positive electrode active material.

The average particle diameter of the negative electrode active material is preferably 1 μm or less. The use of the negative electrode active material having an average particle diameter of 1 μm or less enables an improvement in the cycle performance of the nonaqueous electrolyte secondary battery showing the above charging curve. Particularly, this effect is significant at the time of rapid charging and high-output discharging. However, if the average particle diameter is too small, the distribution of a nonaqueous electrolyte is inclined towards the negative electrode, arousing a fear of a lack of an electrolyte on the positive electrode and therefore, the lower limit of the average particle diameter is preferably designed to be 0.001 μm.

The average particle diameter of the negative electrode active material is measured as follows.

Specifically, about 0.1 g of a sample, a surfactant, and 1 to 2 mL of a distilled water are put in a beaker, and the distilled water is sufficiently stirred, followed by pouring the stirred system in a stirring water vessel. Under this condition, the light intensity distribution is measured every 2 seconds and measured 64 times in total by using SALD-300, which is a Laser Diffraction Particle Size Analyzer manufactured by Shimadzu Corporation, so as to analyze the particle size distribution data.

It is possible to use a carbon material as the conductive agent. The carbon material includes, for example, acetylene black, carbon black, coke, carbon fiber and graphite.

The binder includes, for example, polytetrafluoro ethylene (PTFE), polyvinylidene fluoride (PVdF), ethylene-propylene-diene copolymer (EPDM), styrene-butadiene rubber (SBR), and carboxymethyl cellulose (CMC).

As the above current collector, various metal foils may be used corresponding to the potential of the negative electrode. Examples of these metal foils include an aluminum foil, aluminum alloy foil, stainless foil, titanium foil, copper foil and nickel foil. The thickness of the foil is preferably 8 μm or more and 25 μm or less. Also, in the case where the potential of the negative electrode is nobler than a lithium metal potential by at least 0.3 V, and specifically in the case of using, for example, lithium-titanium oxide as the negative electrode active material, it is preferable to use an aluminum foil or an aluminum alloy foil because the weight of the battery can be lightened.

The average crystal grain size of the aluminum foil or aluminum alloy foil is preferably 50 μm or less. This makes it possible to increase the strength of the current collector outstandingly and it is therefore possible to highly densify the negative electrode under high press pressure, whereby battery capacity can be increased. Also, the dissolution and corrosive deterioration of the negative electrode in over discharge cycles at high temperature (40° C. or more) can be prevented and it is therefore possible to limit a rise in negative electrode impedance. Moreover, the output performance, rapid charging performance and charging/discharging cycle performance can also be improved. A more preferable range of the average crystal grain size is 30 μm or less and a still more preferable range thereof is 5 μm or less.

The average crystal grain size can be obtained as follows. Specifically, the texture of the current collector surface is observed with an electron microscope to obtain the number n of crystal grains present within an area of 1 mm×1 mm. Then, the average crystal grain area S is obtained from the formula "$S=1\times10^6/n$ (μm²)", where n denotes the number of crystal grains noted above. Further, the average crystal grain size d (μm) is calculated from the area S by formula (A) given below:

$$d=2(S/\pi)^{1/2} \qquad (A)$$

The aluminum foil or the aluminum alloy foil having the average crystal grain size not larger than 50 μm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%. Where the battery pack is mounted on a vehicle, it is particularly desirable to use an aluminum alloy foil for forming the negative electrode current collector.

Concerning the mixing ratio of the active material, the conductive agent and the binder in the negative electrode, it is desirable for the negative electrode active material to be used in an amount of 80 to 95% by weight, for the conductive agent to be used in an amount of 3 to 20% by weight and for the binder to be used in an amount of 1.5 to 7% by weight.

2) Positive Electrode

The above positive electrode is manufactured by applying a positive electrode material paste, obtained by dispersing a positive electrode active material, an electroconductive agent and a binder in an appropriate solvent, to one or both surfaces of the current collector.

Given as examples of the active materials of the above positive electrode are various oxides and sulfides. Examples of the active materials include manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide (for example, $Li_xCoO_2$), lithium-nickel-cobalt composite oxide (for example, $Li_xNi_{1-y}Co_yO_2$), lithium-manganese-cobalt composite oxide (for example, $Li_xMn_yCo_{1-y}O_2$), spinel type lithium-manganese-nickel composite oxide (for example, $Li_xMn_{2-y}Ni_yO_4$), lithium phosphates having an olivine structure (for example, $Li_xFePO_4$, $Li_xFe_{1-y}Mn_yPO_4$ and $Li_xCoPO_4$), iron sulfate ($Fe_2(SO_4)_3$) and vanadium oxide (for example, $V_2O_5$). Also, organic materials, for example, electroconductive polymers such as polyaniline and polypyrrole, and disulfide type polymers are exemplified. Inorganic materials, for example, sulfur (S) and carbon fluoride are exemplified.

Preferable examples of the positive electrode active materials for the secondary battery include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), spinel type lithium-manganese-nickel composite oxide ($Li_xMn_{2-y}Ni_yO_4$), lithium-manganese-cobalt composite oxide ($Li_xMn_yCo_{1-y}O_2$) and lithium iron phosphates ($Li_xFePO_4$). It is to be noted x and y are respectively preferably in the range of 0 to 1. These positive electrode active materials permit increasing the battery voltage.

Also, as the positive electrode active material, a lithium-nickel-cobalt-manganese composite oxide having a composition represented by the formula $Li_aNi_bCo_cMn_dO_2$ (where the molar ratios a, b, c, and d are given by the following equations: $0 \leq a \leq 1.1$, $0.1 \leq b \leq 0.5$, $0 \leq c \leq 0.9$, $0.1 \leq d \leq 0.5$) may be used.

As the above electroconductive agent, acetylene black, carbon black, artificial graphite, natural graphite and electroconductive polymers may be used.

As the above binder, for example, polytetrafluoroethylene (PTFE), polyvinylidene fluoride (PVdF), modified PVdF obtained by substituting at least one of hydrogen atoms and fluorine atoms of PVdF with other substituents, vinylidene fluoride/propylene hexafluoride copolymer, polyvinylidene fluoride/tetrafluoroethylene/propylene hexafluoride ternary copolymer or the like may be used.

As the organic solvent that disperses the above binder, N-methyl-2-pyrrolidone (NMP), dimethylformamide (DMF) or the like may be used.

Examples of the material of the above current collector may include an aluminum foil, aluminum alloy foil, stainless foil and titanium foil which have a thickness of 8 to 25 μm.

For the above positive electrode current collector, an aluminum foil or an aluminum alloy foil is preferable and the average crystal grain size of the current collector is preferably 50 μm or less like the negative electrode current collector. The average crystal grain size of the current collector is more preferably 30 μm or less and still more preferably 5 μm or less. If the above average crystal grain size is 50 μm or less, the strength of the aluminum foil or aluminum alloy foil can be outstandingly increased and it is therefore possible to highly densify the positive electrode under high press pressure, whereby battery capacity can be increased.

The aluminum foil or the aluminum alloy foil having the average crystal diameter not larger than 50 μm is affected in various fashions by many factors such as the material texture, the impurities, the process conditions, the history of the heat treatment and the annealing conditions, and the crystal grain diameter can be adjusted by an appropriate combination of the factors noted above during the manufacturing process.

It is desirable for the aluminum foil or the aluminum alloy foil to have a thickness not larger than 20 μm, more desirably not larger than 15 μm. It is desirable for the aluminum foil to have a purity not lower than 99%. It is desirable to use an aluminum alloy containing at least one element selected from the group consisting of magnesium, zinc and silicon. On the other hand, it is desirable for the amount of a transition metal such as iron, copper, nickel or chromium, which is contained in the aluminum alloy, to be not larger than 1%.

Concerning the mixing ratio of the active material, the conductive agent and the binder in the positive electrode, it is desirable for the positive electrode active material to be used in an amount of 80 to 95% by weight, for the conductive agent to be used in an amount 3 to 20% by weight, and for the binder to be used in an amount of 1.5 to 7% by weight.

3) Separator

As the separator, a porous separator is used.

Examples of the material of the porous separator include porous films containing poyethylene, polypropylene, cellulose or polyvinylidene fluoride (PVdF) or unwoven fabrics made of synthetic resins. Among these materials, a porous film made of polyethylene or polypropylene or both is preferable because it is easily provided with a shutdown function of blocking pores to remarkably reduce charge and discharge current when the temperature of the battery is raised and it is therefore possible to improve the safety of a secondary battery.

4) Nonaqueous Electrolyte

Examples of the nonaqueous electrolyte include organic electrolytic solutions obtained by dissolving one or more of lithium salts selected from $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$ and $LiB[(OCO)_2]_2$, in a concentration of 0.5 to 2 mol/L in an organic solvent.

As the organic solvent, cyclic carbonates such as propylene carbonate (PC) and ethylene carbonate (EC), chain carbonates such as diethyl carbonate (DEC), dimethyl carbonate (DMC) and methylethyl carbonate (MEC), chain ethers such as dimethoxyethane (DME) and diethoxyethane (DEE), cyclic ethers such as tetrahydrofuran (THE) and dioxolan (DOX), γ-butyrolactone (GBL), acetonitrile (AN) and sulfolane (SL) may be used either singly or as mixtures of two or more.

Also, a molten salt (ionic liquid) containing lithium ions may be used as the nonaqueous electrolyte. If an ionic liquid which comprises a lithium ion and organic material cation and anion and is a liquid at 100° C. or less and preferably at lower than the ambient temperature is selected, a secondary battery operable in a wide temperature range can be obtained.

5) Case

The thickness of the laminate film to be used for the case is preferably 0.2 mm or less.

The laminate film may comprise a composite film material obtained by laminating a thermally fusible resin film (thermoplastic resin film) formed as the innermost layer, a metal foil such as an aluminum foil and an organic resin film having stiffness in this order.

As the above thermally fusible resin film, for example, a polyethylene (PE) film, polypropylene (PP) film, polypropylene/polyethylene copolymer film, ionomer film, ethylenevinyl acetate (EVA) film or the like may be used. Also, as the above organic resin film having stiffness, for example, a polyethylene terephthalate (PET) film, nylon film or the like may be used.

6) Positive Electrode Terminal and Negative Electrode Terminal

As the positive electrode terminal, aluminum, titanium or alloys originated from these metals or stainless may be used. As the negative electrode terminal, nickel, copper or alloys originated from these metals may be used. When the potential of the negative electrode is nobler than a lithium metal potential by at least 1 V, and, for example, in the case of using lithium/titanium oxide as the negative electrode active material, aluminum or an aluminum alloy may be used as the negative electrode terminal. In this case, it is preferable that aluminum or an aluminum alloy be used for both the positive electrode terminal and the negative electrode terminal because the battery can be made lightweight and electrical resistance can be limited to a small value.

Figure 7:
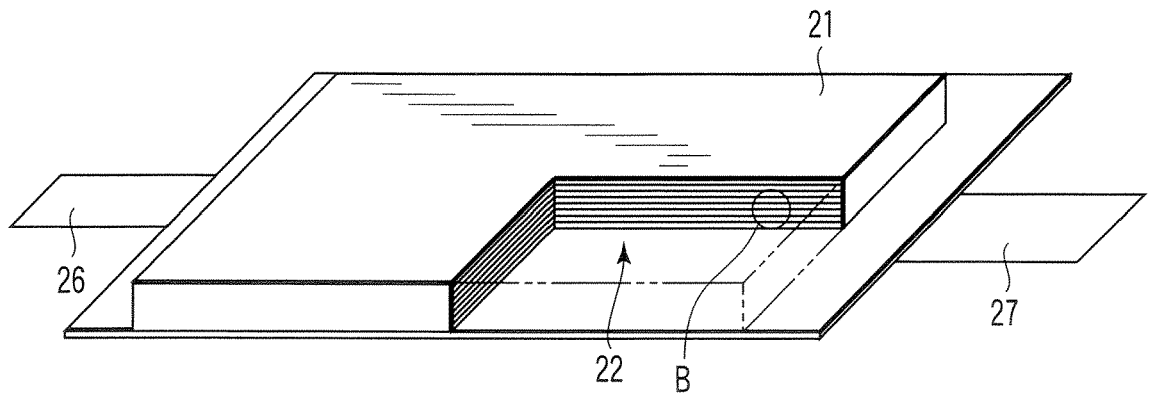
FIG. 7 is a partially cutaway view typically showing another example of a flat type nonaqueous secondary battery.
Figure 8:
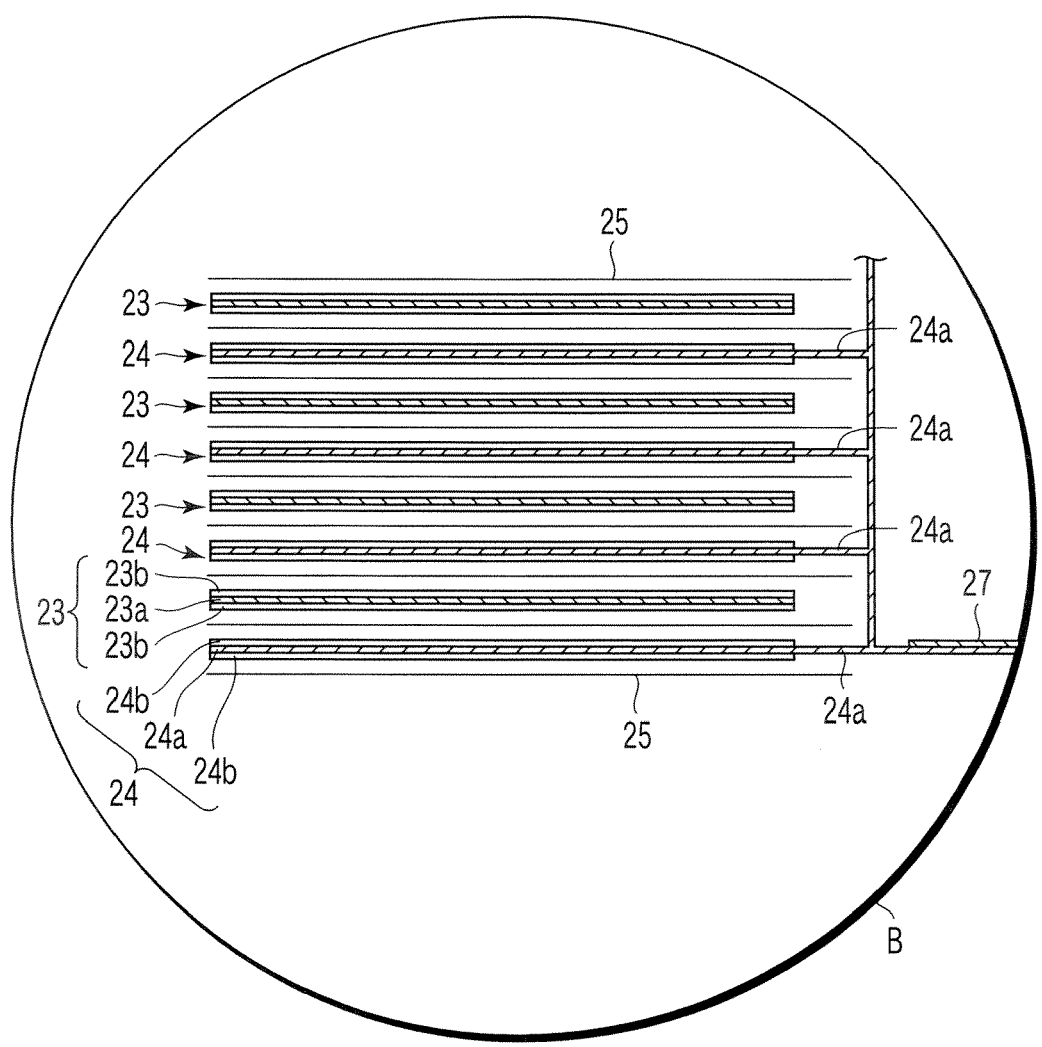
FIG. 8 is an enlarged sectional view of the part B of FIG. 7.

The nonaqueous secondary battery is not limited to the above structure shown in FIGS. 5 and 6 but may be designed to be the structure shown in FIGS. 7 and 8.

As shown in FIG. 7, a stack type electrode group 22 is housed in a case 21 formed of a laminate film. As shown in FIG. 8, the stack type electrode group 22 is constructed such that a positive electrode 23 and a negative electrode 24 are stacked one upon the other a plurality of times alternately with a separator 25 interposed between the positive electrode 23 and the negative electrode 24. The electrode group 22 includes a plurality of the positive electrodes 23 each comprising a positive electrode current collector 23*a* and positive electrode active material layers 23*b* supported on both surfaces of the positive electrode current collector 23*a*. The electrode group 22 also includes a plurality of the negative electrodes 24 each comprising a negative electrode current collector 24*a* and negative electrode active material layers 24*b* supported on both surfaces of the negative electrode current collector 24*a*. One side of the negative electrode current collector 24*a* included in the negative electrode 24 protrudes from the positive electrode 23. The negative electrode current collector 24*a* protruding from the positive electrode 23 is electrically connected to a band-like negative electrode terminal 27. The tip portion of the band-like negative electrode terminal 27 is drawn to the outside from the case 21. Also, that side of the positive electrode current collector 23*a* included in the positive electrode 23 which is positioned on the side opposite to the protruding side of the negative electrode current collector 24*a*, though the protruding side of the positive electrode current collector 23*a* is not shown in the drawing. The positive electrode current collector 23*a* protruding from the negative electrode 24 is electrically connected to a band-like positive electrode terminal 26. The tip portion of the band-like positive electrode terminal 26 is positioned on the side opposite to the side of the negative electrode terminal 27 and is drawn to the outside from a side of case 21. In the flattened nonaqueous electrolyte secondary battery shown in FIGS. 7 and 8, the positive electrode terminal 26 and the negative electrode terminal 27 are drawn to the outside from the mutually facing two sides of the case 21.

Figure 9:
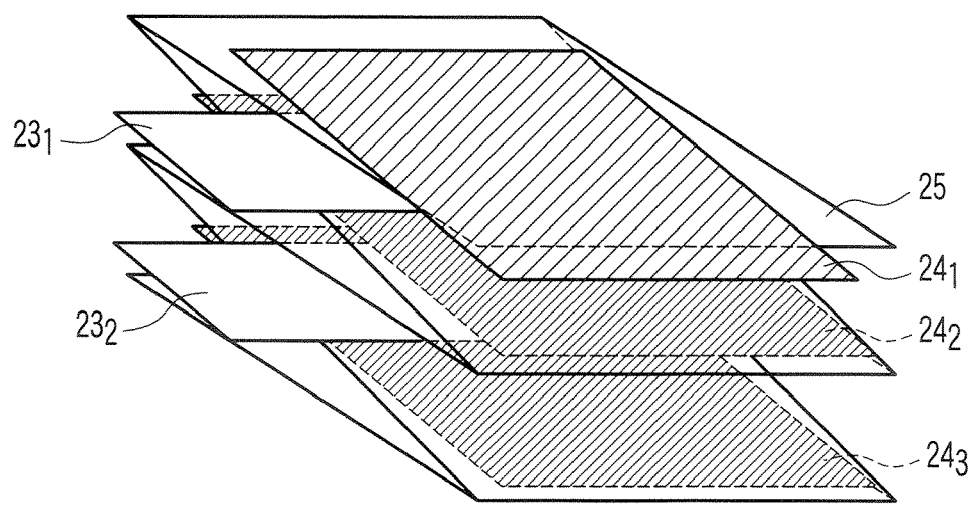
FIG. 9 is a perspective view of an electrode group having a laminate structure which is used in a nonaqueous electrolyte secondary battery.

Though the aforementioned coiled structure as shown in FIGS. 5 and 6 and the aforementioned laminate structure as shown in FIGS. 7 and 8 are given as examples of the structure of the electrode group. It is, however, preferable to use the laminate structure as the structure of the electrode group in order that the electrode group has high safety and reliability at the same time. Moreover, in order to attain high large-current performance also when the battery is used for a long period of time, the electrode group containing the positive electrode and the negative electrode has a laminate structure and as shown in FIG. 9, it is preferable to fold a separator in a zigzag manner. The band-like separator 25 is folded in a zigzag manner. A strip negative electrode 241 is laminated on the uppermost layer of the separator 25 folded in a zigzag manner. A strip positive electrode 231, a strip negative electrode 242, a strip positive electrode 232 and a strip negative electrode 243 are each inserted in this order from above into a part where the separators 25 are overlapped on each other. The positive electrodes 23 and the negative electrodes 24 are alternately arranged between the piled zigzag-shaped separators 25 to thereby obtain an electrode group having a laminate structure.

Third Embodiment

It is desirable for the battery module system according to the second embodiment of the present invention to be used in the field requiring the large current performance and the charge-discharge cycle performance. To be more specific, it is desirable for the battery module system according to the second embodiment of the present invention to be used in the power source for a digital camera and for the vehicles such as the hybrid electric automobiles having two to four wheels, electric automobiles having two to four wheels, the electric mopeds, and the charging type vacuum cleaner. It is preferable to be used for the vehicles.

A vehicle according to a third embodiment of the present invention comprises the battery module system according to the second embodiment. The vehicle noted above includes, for example, a hybrid electric automobile having 2 to 4 wheels, an electric automobile having 2 to 4 wheels, and an electric moped. FIGS. 10 to 15 show various type of vehicles having 2 to 4 wheels and equipped with the battery module system according to the second embodiment. In FIGS. 10 to 15, the charger of the battery module system is arranged in a charging station (not shown).

Figure 10:
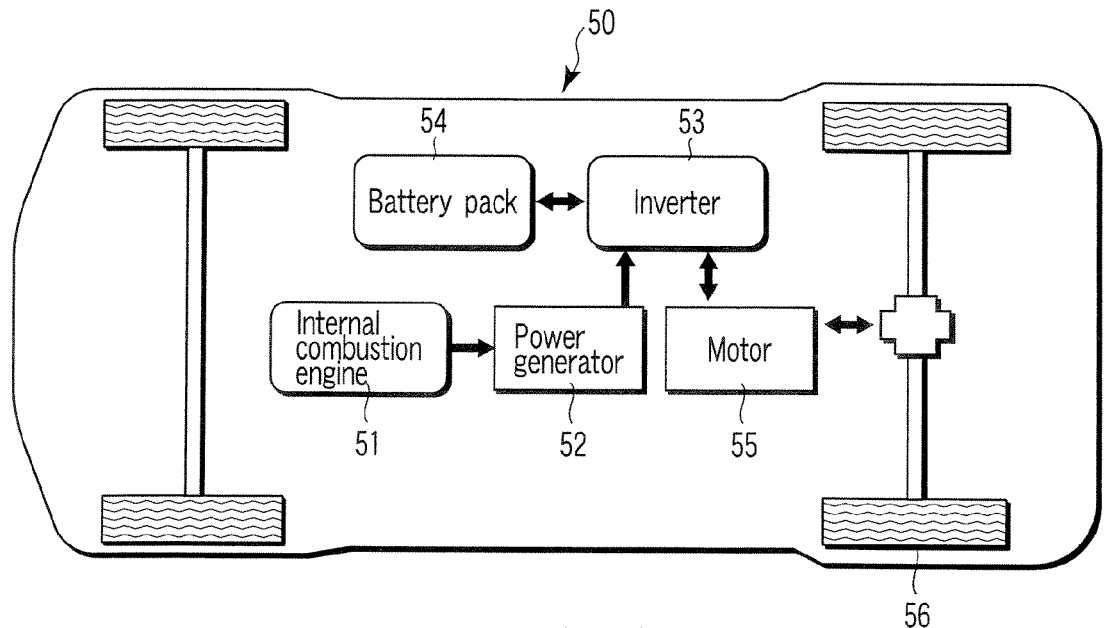
FIG. 10 is a typical view showing a series hybrid car according to a third embodiment.
Figure 11:
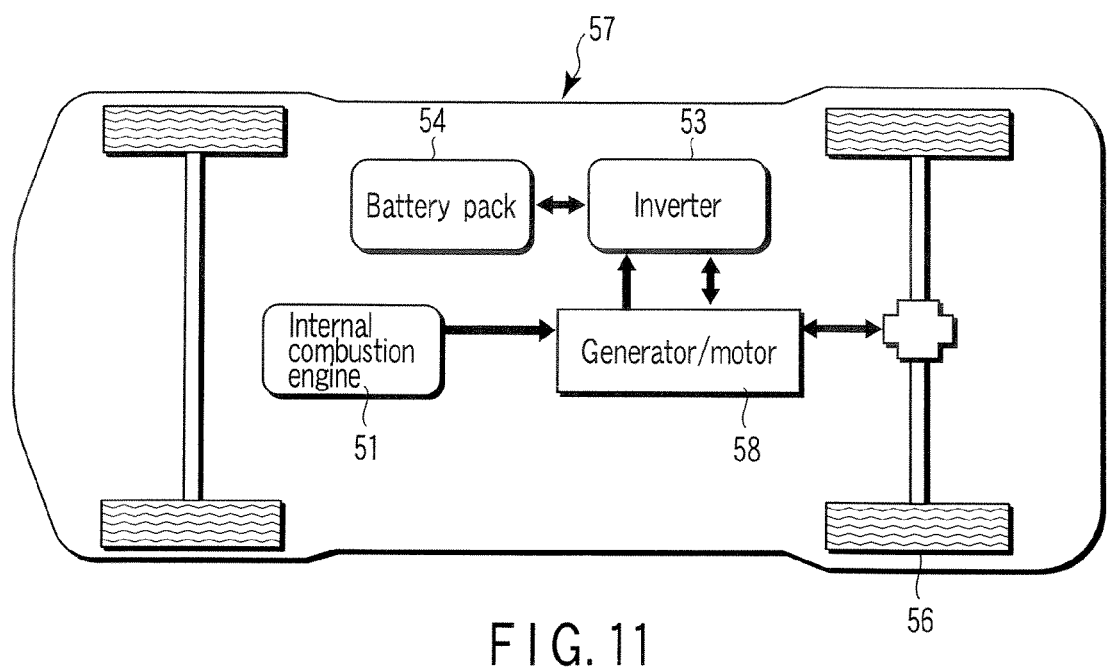
FIG. 11 is a typical view showing a parallel hybrid car according to the third embodiment.

FIGS. 10 to 12 show various type of hybrid vehicles in which an internal combustion engine and a motor driven by a battery module system are used in combination as the power source for the driving. For driving the vehicle, required is the power source exhibiting a wide range of the rotation speed and the torque depending on the running conditions of the vehicle. Since the torque and the rotation speed exhibiting an ideal energy efficiency are limited in the internal combustion engine, the energy efficiency is lowered under the driving conditions other than the limited torque and the rotation speed. Since the hybrid vehicle includes the internal combustion engine and the electric motor, it is possible to improve the energy efficiency of the vehicle. Specifically, the internal combustion engine is operated under the optimum conditions so as to generate an electric power, and the wheels are driven by a high-efficiency electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid vehicle can be roughly classified into three types depending on the combination of the internal combustion engine and the electric motor.

FIG. 10 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack of the battery module system according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 10 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above denotes the capacity at the time when the battery pack is discharged at a rate of 0.2 C.

FIG. 11 shows the construction of a hybrid vehicle 57 that is called a parallel hybrid vehicle. A reference numeral 58 shown in FIG. 11 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 11 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 5 to 10 Ah.

FIG. 12 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 5 to 10 Ah.

It is desirable for the nominal voltage of the battery pack included in the hybrid vehicles as shown in FIGS. 10 to 12 to fall within a range of 200 to 600 V.

The battery module system according to embodiments of the present invention is adapted for use in the series-parallel hybrid vehicle.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 13, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the vehicle.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 14:
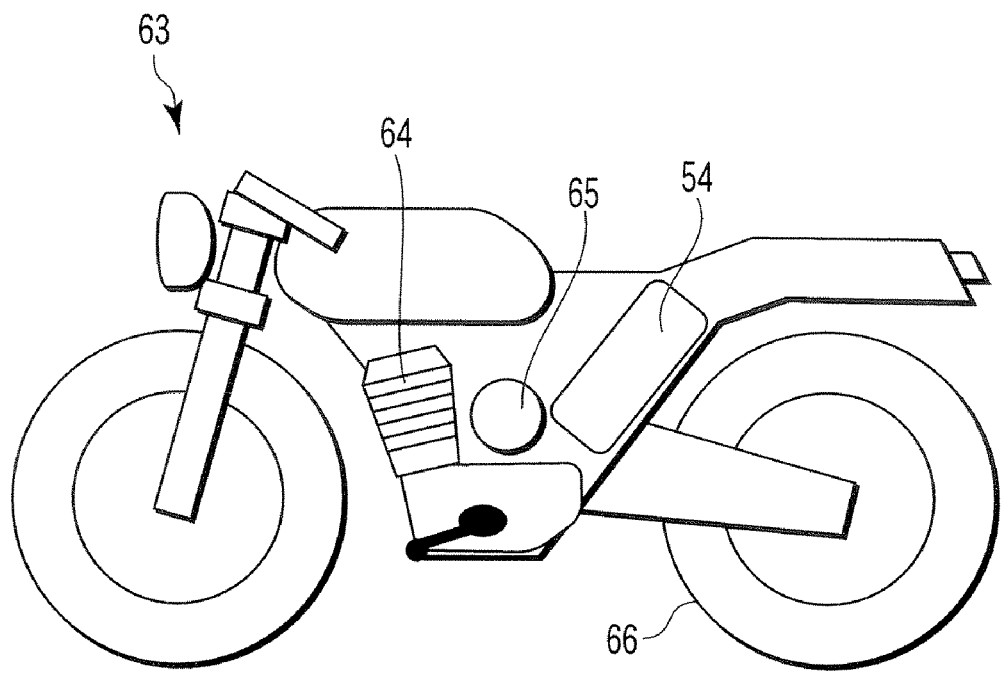
FIG. 14 is a typical view showing a hybrid motorcycle according to the third embodiment.

FIG. 14 exemplifies the construction of a hybrid motor bicycle. It is possible to construct a hybrid motor bicycle exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 15:
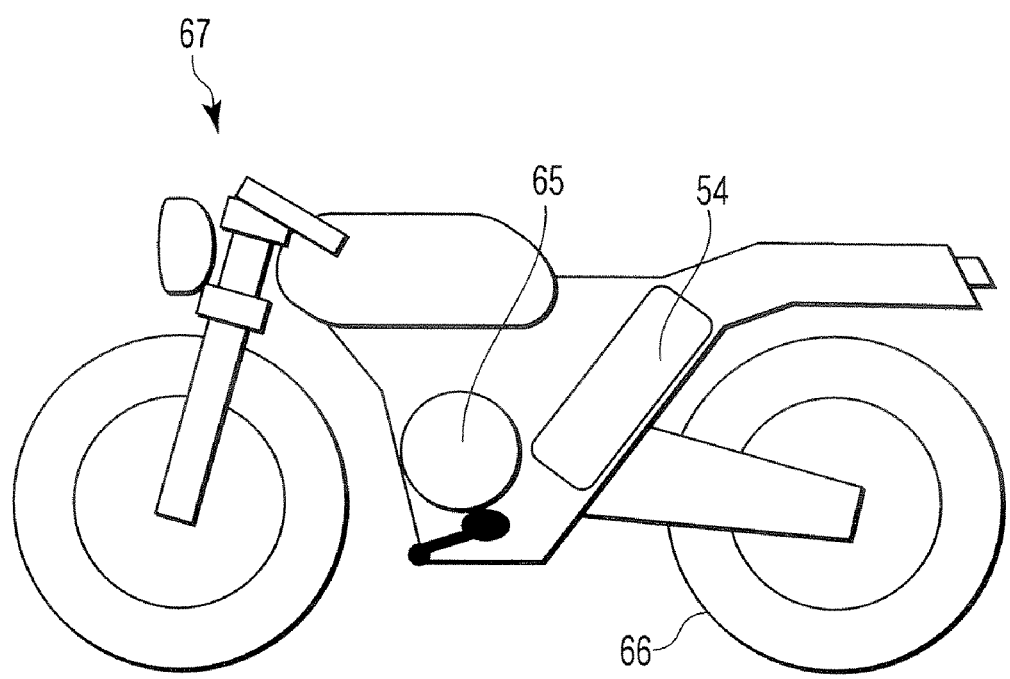
FIG. 15 is a typical view showing an electric motorcycle according to the third embodiment.

FIG. 15 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Figure 16:
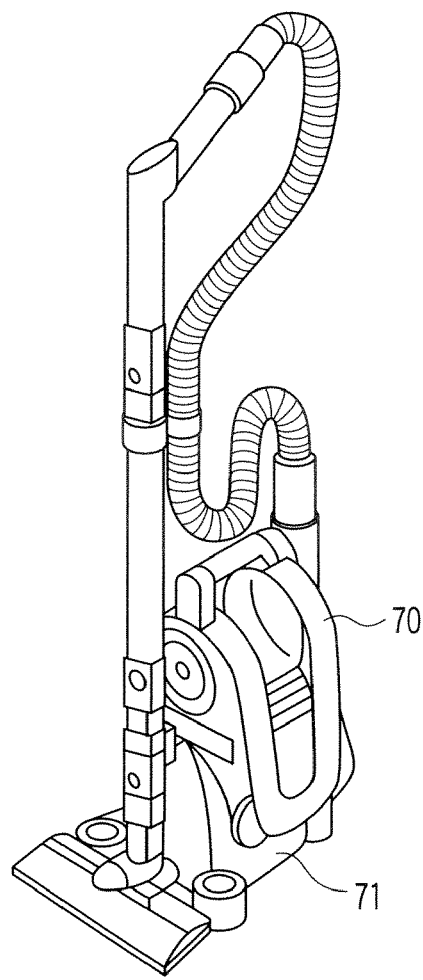
FIG. 16 is a typical view showing a charging type vacuum cleaner according to the third embodiment.

FIG. 16 shows one example of a charging type vacuum cleaner according to the third embodiment of the present invention. The charging type vacuum cleaner accommodates a battery pack included in a battery module system according to the second embodiment in a casing 70 of the vacuum cleaner. A charger 71 doubling as a support stand functions as a charger of a battery module system according to the second embodiment. The rated capacity of the battery pack is preferably designed to be in the range of 2 to 10 Ah. A more preferable range is from 2 to 5 Ah. Also, the nominal voltage of the battery pack is preferably designed to be in the range of 20 to 80 V.

Typical examples are given below to explain the present invention in more detail. However, these written examples are not intended to limit the present invention, and modifications and variations of these examples are embraced in the present invention within the spirit and scope of the present invention.

Example 1

Lithium cobalt oxide ($LiCoO_2$) was used as a positive electrode active material. The positive electrode active material, an electrically conductive agent and a binder were compounded and dispersed in an n-methylpyrrolidone (NMP) solvent to prepare a slurry. The obtained slurry was applied to an aluminum foil (purity: 99.99%) having a thickness of 15 μm and an average crystal grain size of 50 μm to manufacture a positive electrode through a drying step and a pressing step.

Lithium titanate ($Li_4Ti_5O_{12}$) was prepared as a negative electrode active material. The negative electrode active material, an electrically conductive agent and a binder were compounded and dispersed in an n-methylpyrrolidone (NMP) solvent to prepare a slurry. The obtained slurry was applied to an aluminum foil (purity: 99.99%) having a thickness of 15 μm and an average crystal grain size of 50 μm to manufacture a negative electrode through a drying step and a pressing step.

Next, a 20-μm-thick separator of a band porous film made of polyethylene was arranged sideways. A positive electrode strip was placed on the left end of the separator and the separator was turned down towards the left side along the right end of the positive electrode strip. Then, a negative electrode strip was placed on the separator and the separator was turned down towards the right side along the left end of the negative electrode strip. These procedures are repeated to laminate positive electrodes and negative electrodes sandwiching the separator folded in a zigzag shape between each pair of positive and negative electrodes, thereby manufacturing an electrode group having 31 positive electrodes and 30 negative electrodes.

The manufactured electrode group was pressed to arrange its shape and then, the positive electrode terminal was connected with the positive electrodes, and the negative electrode terminal was connected with the negative electrodes. The electrode group was sealed in a case made of a laminate film and a nonaqueous electrolyte was injected into the case to manufacture a flat nonaqueous electrolyte secondary battery having a capacity of 3 Ah. The full charge voltage $V_{H1}$ of the resulting secondary battery was 2.8 V. The voltage variation rate A (mV/% SOC) as the function of SOC is 150 (mV/% SOC) when the charge voltage reached a full charge voltage. Also, the voltage $V_{M1}$ of the unit cell when the above voltage variation rate A (mV/% SOC) reached 20 (mV/% SOC) from less than 20 (mV/% SOC) was 2.63 V.

Five unit cells of this type were connected in series and a voltage measuring terminal was drawn from each connecting portion to fabricate a battery pack as shown in FIG. 2, with which a charger was then connected to obtain a battery module system. The charge current $I_1$ in the first constant-current charging of the first charging step was set to 60 A (20 C) and, in the second charging step, $V_{H2}$ was set to 2.6 V and V2 was set to 13 V to carry out the first constant-voltage charging. Also, in this charging method, the branch current $I_3$ at which the second charging step was terminated was set to 0.15 A and the charging was finished in this second charging step. The SOC of the battery module when the charging was finished was 95%. The time required to charge up to 80% of the SOC of the battery module from the discharged state was about 5 minutes. Variations in the voltage of the battery module and in charge current were almost those as shown in FIG. 17.

Figure 17:
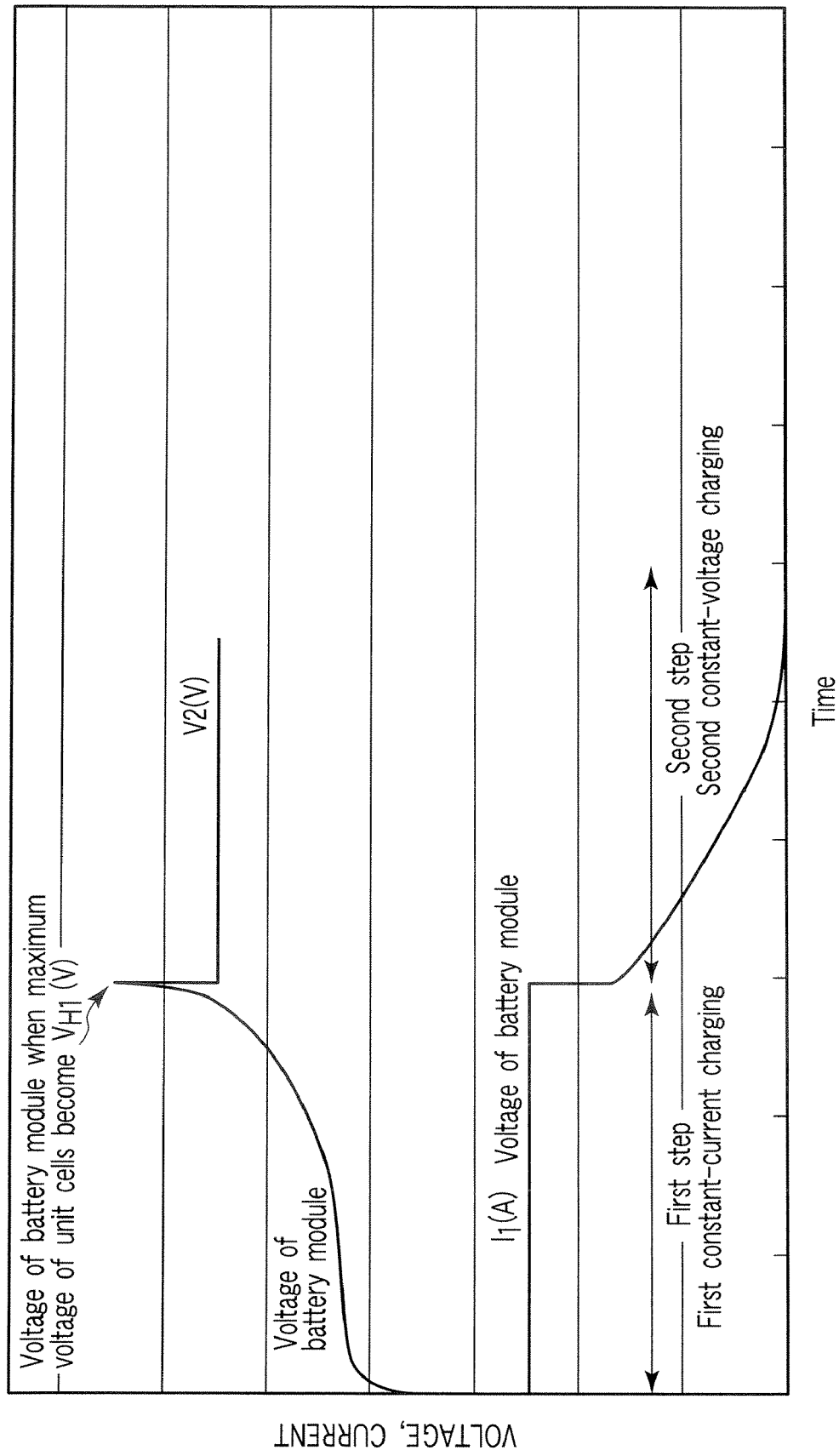
FIG. 17 is a characteristic view showing variations with time in the voltage and current of a battery module in a battery module system of Example 1.

As shown in FIG. 17, the first charging step was finished when the maximum voltages of the unit cells which were detected by a voltage detecting circuit 4 reached the full charge voltage $V_{H1}$ and the process was transferred to the second charging step. In the second charging step, the charge current was gradually decreased to a current $I_3$ because this step was first constant-voltage charging step in which the voltage of the battery module was controlled to V2 given by the aforementioned equation (1).

Example 2

A unit cell was manufactured, a battery pack was fabricated and a charger was connected with the battery pack in the same manner as in Example 1, to obtain a battery module system. The voltage variation rate A (mV/% SOC) as the function of SOC when the charge voltage reached a full charge voltage and voltage $V_{M1}$ of the unit cell were the same as those in Example 1. The charge current $I_1$ was set to the same value adopted in Example 1 to carry out the first charging step. Then, $V_{H2}$, V2 and $I_3$ were set to the same values as those used in Example 1 and $I_2$ was set to 15 A to carry out constant-voltage/constant-current charging in the second step. Other conditions were made to be the same as those in Example 1. The time required to charge up to 80% of the SOC of the battery module from the discharged state was about 6 minutes. The SOC of the battery module when the charging was completed was 95%. Variations in the voltage of the battery module and in charge current were almost those as shown in FIG. 18.

Figure 18:
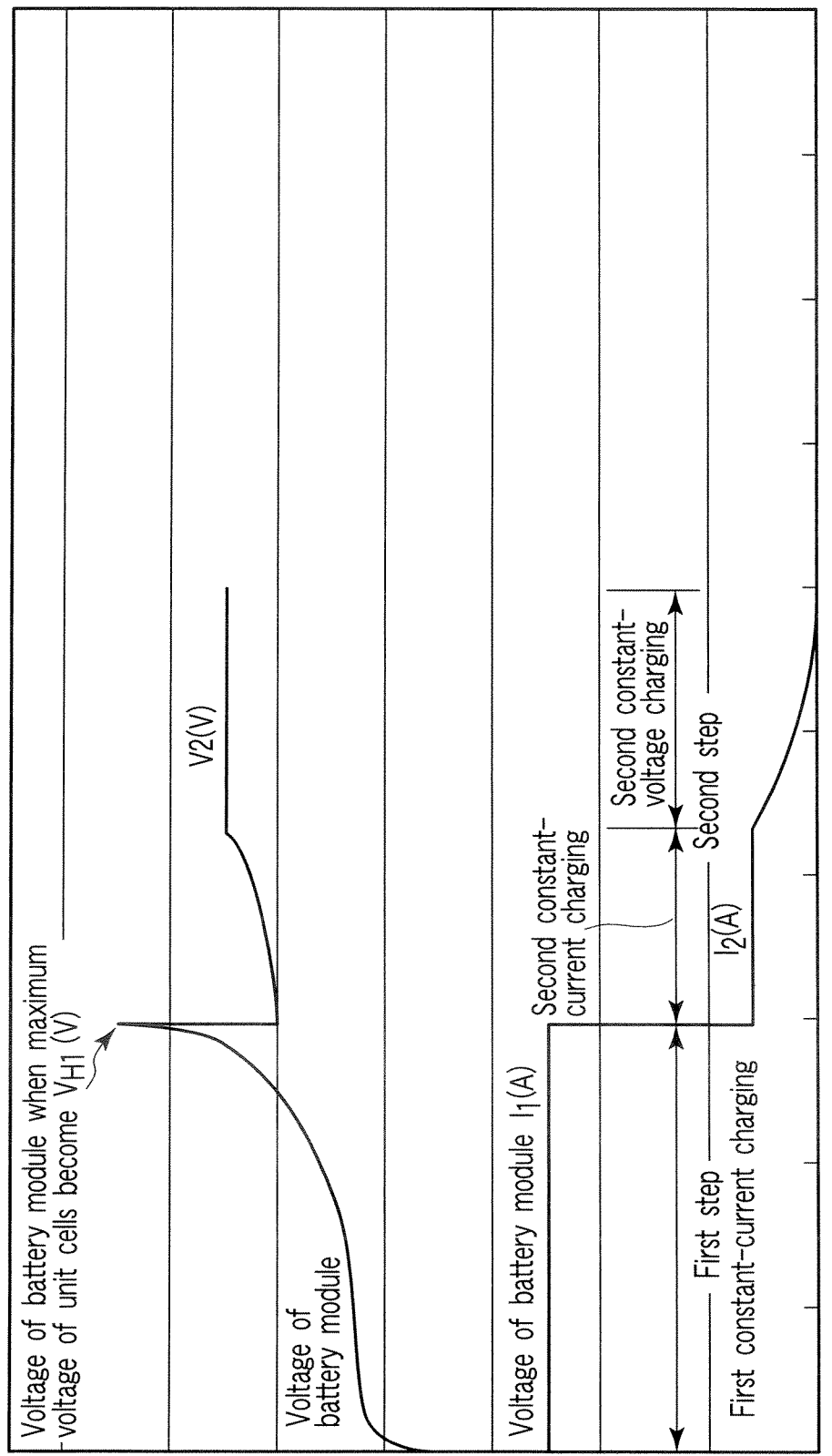
FIG. 18 is a characteristic view showing variations with time in the voltage and current of a battery module in a battery module system of Example 2.

As shown in FIG. 18, variations in the voltage and current of the battery module in the first charging step had the same tendency as in the case of Example 1. In the initial stage of the second charging step, the second constant-current charging was carried out at a current $I_2$ lower than the charging current $I_1$ in the first charging step and therefore, the voltage of the battery module could be limited to a value lower than the full charge voltage $V_{H1}$. When the voltage of the battery module was raised up to V2, the charging process was transferred to the first constant-voltage charging to carry out the second charging step.

Example 3

A unit cell was manufactured, a battery pack was fabricated and a charger was connected with the battery pack in the same manner as in Example 1, to obtain a battery module system. The voltage variation rate A (mV/% SOC) as the function of SOC when the charge voltage reached a full charge voltage and voltage $V_{M1}$ of the unit cell were the same as those in Example 1. $I_1$, $V_{H2}$, V2, $I_2$ and $I_3$ were set to the same values as those used in Example 2 to carry out the process including the second charging step. After that, as a third charging step, the charging current $I_4$ was set to 1.5 A and the charge voltage $V_{H3}$ was set to $V_{H1} \times n$ 14 V to carry out constant-voltage/constant-current charging. In this step, the branched current $I_5$ for terminating the third charging step was set to 0.15 A and the charging process was terminated after the completion of the first to third steps in this method. When the charging was completed, the SOC of the battery module was 100%. The time required to charge up to 80% of SOC of the battery module from the discharged state was about 6 minutes. Variations in the voltage of the battery module and in charge current were almost those shown in FIG. 19.

Figure 19:
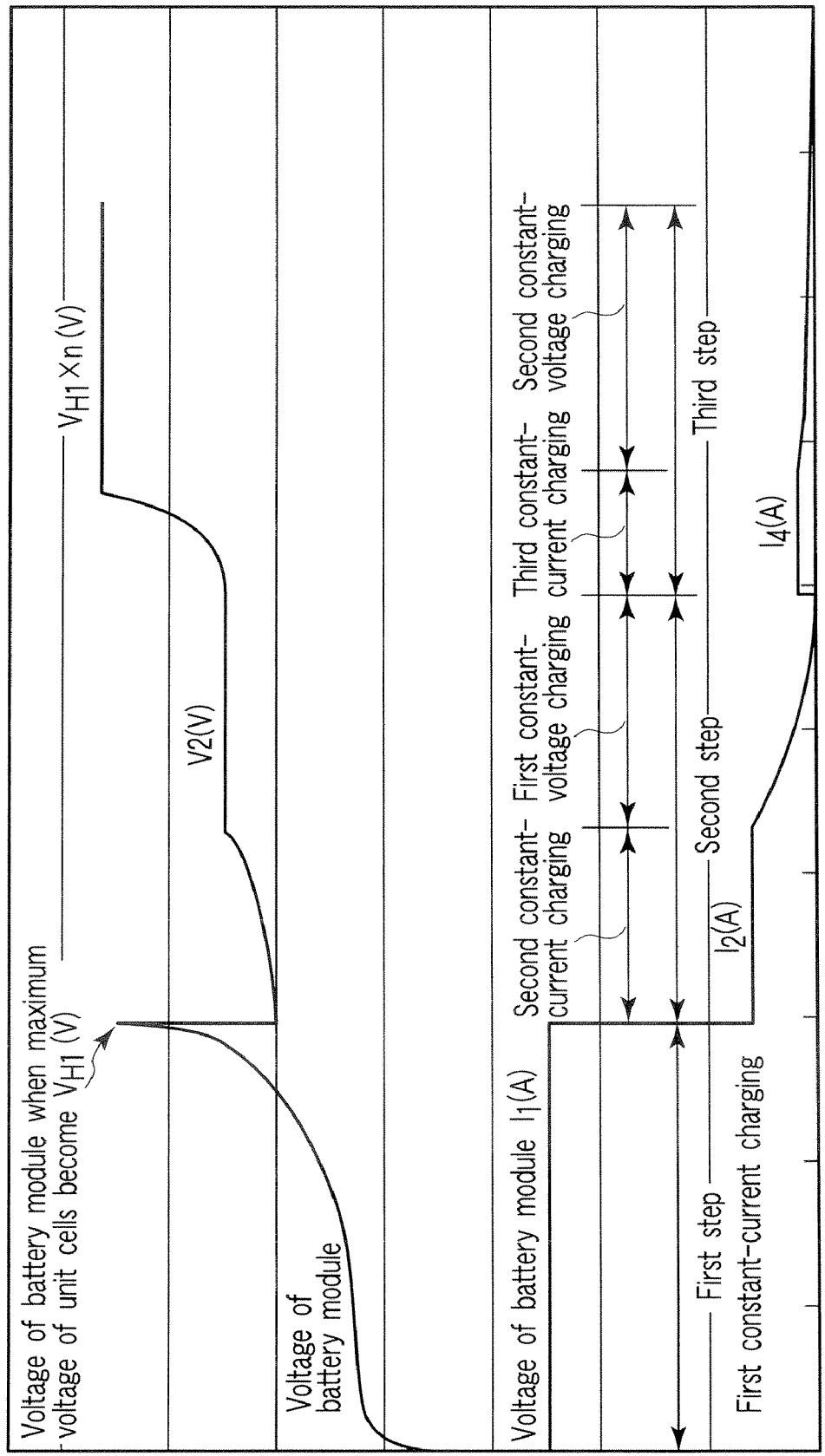
FIG. 19 is a characteristic view showing variations with time in the voltage and current of a battery module in a battery module system of Example 3.

As shown in FIG. 19, variations in the voltage and current of the battery module in the first and second charging steps had the same tendency as in the case of Example 1. In the third charging step, the third constant-current charging was carried out at a charge current $I_4$ and then, the second constant-voltage charging at a voltage represented by (full charge voltage $V_{H1} \times n$) was carried out.

Example 4

A unit cell was manufactured, a battery pack was fabricated and a charger was connected with the battery pack in the same manner as in Example 1 except that a lithium-nickel-cobalt-aluminum composite oxide powder represented by $LiNi_{0.75}Co_{0.19}Al_{0.05}O_2$ was used as the positive electrode active material, to obtain a battery module system. The full charge voltage $V_{H1}$ of this unit cell was 2.8 V similarly to the case of Example 1. The voltage variation rate A (mV/% SOC) as the function of SOC when the charge voltage reached a full charge voltage was 160 (mV/% SOC) and voltage $V_{M1}$ of the unit cell was 2.61 V.

The charge current $I_1$ in the first charging step was set to 60 A (20 C), and I2 was set to 15 A, $V_{H2}$ was set to 2.6 V and V2 was set to 13 V in the second charging step to carry out constant-voltage/constant-current charging. After that, as a third charging step, the charging current $I_4$ was set to 1.5 A and the charge voltage was set to $V_{H1} \times n = 14$ V to carry out constant-voltage/constant-current charging.

In this step, the branched current $I_5$ for terminating the third charging step was set to 0.15 A and the charging process was terminated after the completion of the first to third charging steps in this method. The SOC of the battery module was 100% when the charging was completed.

The time required to charge up to 80% of the SOC of the battery module from the discharged state was about 6 minutes. Variations in the voltage of the battery module and in charge current had the same tendency as in the case of FIG. 19.

Comparative Example 1

A unit cell was manufactured, a battery pack was fabricated and a charger was connected with the battery pack in the same manner as in Example 1. The voltage variation rate A (mV/% SOC) as the function of SOC when the charge voltage reached the full charge voltage and voltage $V_{M1}$ were the same as those in Example 1. The charging method was as follows: the charge voltage was set to $V_{H1} \times n = 14$ V and the charge current was set to I=60 A to carry out constant-voltage/constant-current charging, and the charging was finished when the charge current was reduced to 0.15 A.

Comparative Example 2

A unit cell was manufactured, a battery pack was fabricated and a charger was connected with the battery pack in the same manner as in Example 1. The voltage variation rate A (mV/% SOC) as the function of SOC when the charge voltage reached the full charge voltage and voltage $V_{M1}$ were the same as those in Example 1. The charging method was as follows: the charge voltage was set to $V_{H1} \times n = 14$ V and the charge current was set to I=3 A to carry out constant-voltage/constant-current charging, and the charging was finished when the charge current was reduced to 0.15 A.

The manufactured battery module system was subjected to a cycle life test in which charge and discharge operations were carried out repeatedly. The charging was carried out using the connected charger in a 25° C. environment, and the charging method was the same as that explained in each of the examples and comparative examples. As the discharging method, such a method was adopted in which a discharge capacity measuring device was connected with the battery module system in a 25° C. environment to discharge until the lowest value of the voltages of the unit cells was 2 V at a constant current of 30 A.

Figure 20:
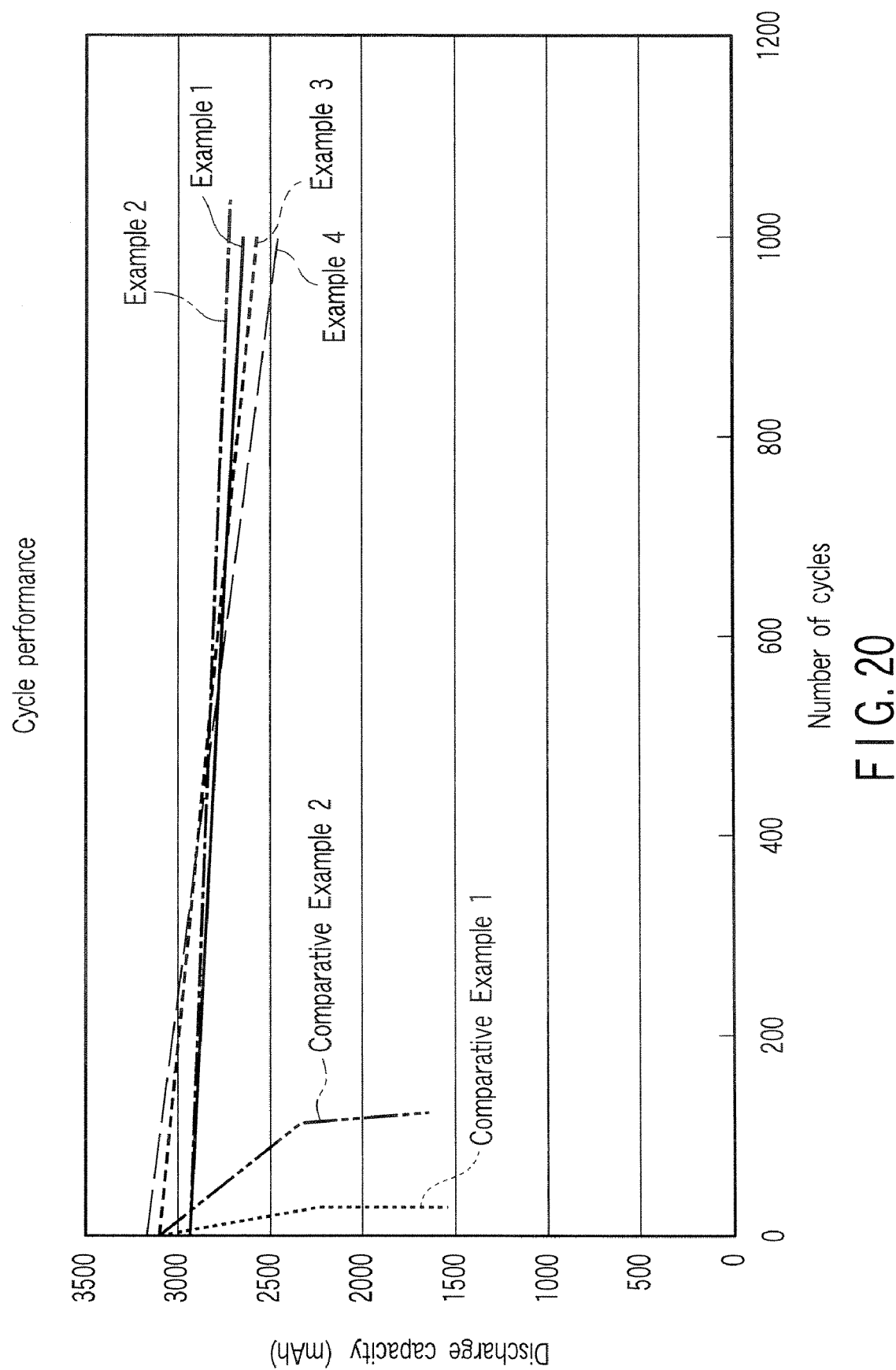
FIG. 20 is a characteristic view showing the relationship between the discharge capacity and the number of cycles of each battery module system obtained in Examples 1 to 4 and Comparative Examples 1 and 2.

The cycle dependency of the discharge capacity which is obtained in the test is shown in FIG. 20.

In Example 1, the capacity was monotonously decreased little by little until 1000 cycles. However, no large deterioration was observed. Example 2 was almost the same as Example 1, but slightly more decreased in deterioration. Example 3 had a large discharge capacity in the initial stage because it involved the third discharging step and was charged until the voltage of the battery module was closer to the full charge. Though Example 3 had slightly larger deterioration in capacity, this deterioration was likewise limited to a monotonous one. As to Example 4, the following results were obtained: though it had a tendency similar to that of Example 3 that used the same charging method, it had a slightly larger initial capacity due to a different positive electrode active material and the rate of a reduction in capacity caused by repetitive operations was also slightly larger. These results are considered to show almost the same performance as in the case of making the cycle test of the unit cell.

On the other hand, in Comparative Example 1, the rate of deterioration in capacity was large and also, it was observed that the deterioration was significantly accelerated after about 20 cycles. When the charging condition at this time was examined, it was found that cells having a voltage higher than the overcharge prohibiting voltage (2.9 V) of the protective circuit arise because of variations in the voltages of the unit cells, and the current was cut before a regular charging step was finished. The same may be applied to Comparative Example 2: the rate of deterioration was slightly lower but it was observed that the deterioration was significantly accelerated after about 100 cycles.

As mentioned above, if a battery module system obtained by connecting nonaqueous electrolyte secondary batteries, of which the voltage variation rate A (mV/% SOC) to SOC when the charge voltage reaches a full charge voltage is more than 20 (mV/% SOC), in series is charged according to the conventional method, overcharge arises due to variations in the voltage of unit cells, leading to significantly short cycle life. However, the charging method of the present invention is free from the generation of overcharge, making it possible to improve the cycle performance.

As mentioned above, this embodiment can improve the cycle performance of a battery module system by suppressing variations in the voltages of unit cells when charging the battery module comprising a plurality of nonaqueous electrolyte secondary batteries connected in series and also can provide a charging method reduced in the possibility of overcharge and improved in safety.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery module system comprising:
    a battery module comprising battery units which are connected in series, each of the battery units comprising a unit cell having a voltage variation rate A mV/% SOC at a full charge voltage $V_{H1}$ (V) larger than 20 mV/% SOC, which is a value obtained when the unit cell is charged at a current of 1 C at 25° C.
    a current supply member which supplies current to the battery module;
    a voltage detecting member which detects a voltage of the unit cells; and
    a control member which controls the current to a current $I_1$ until at least one unit cell reaches the full charge voltage $V_{H1}$ (V) and then controls a voltage of the battery module to a voltage V2 (V) given by the following equation (1):

$$V2 = V_{H2} \times n \qquad (1)$$

where $V_{H2}$ is a voltage lower than a voltage $V_{M1}$ of the unit cell, where $V_{M1}$ is a rate of variation point where rate of variation is 20 mV/% SOC, when the voltage variation rate A mV/% SOC reaches 20 mV/% SOC from less than 20 mV/% SOC and n denotes the number of battery units connected in series.

2. The system according to claim 1, wherein the control member controls the current to a current $I_2$ smaller than the current $I_1$ after controlling the current to the current $I_1$ and before controlling the voltage of the battery module to the voltage V2.

3. The system according to claim 1, wherein the control member controls the current to a constant current of 3 C or less and controls the voltage of the battery module to a constant voltage not higher than a voltage $V_{H3}$ (V) given by the following equation (2), after controlling the voltage of the battery module to the voltage V2:

$$V_{H3} = V_{H1} \times n \qquad (2)$$

where $V_{H1}$ is the full charge voltage and n denotes the number of the battery units connected in series.

4. The system according to claim 1, wherein the control member controls the current $I_1$ such that a time taken until the SOC of the battery module reaches 80% from 0% is within 20 minutes.

5. The system according to claim 4, wherein the current $I_1$ is 5 C or more.

6. The system according to claim 1, wherein the control member controls the voltage V2 such that the SOC of the battery module reaches 70 to 98%.

7. The system according to claim 1, wherein each of the battery units comprises a plurality of the unit cell.

8. The system according to claim 1, wherein the unit cell is a nonaqueous electrolyte secondary battery comprising a positive electrode, a separator and a negative electrode containing lithium-titanium oxide.

9. The system according to claim 7, wherein the lithium-titanium oxide has a spinel structure.

10. The system according to claim 7, wherein the negative electrode comprises a negative electrode current collector formed from aluminum having an average crystal grain size of 50 μm or less or from an aluminum alloy having an average crystal grain size of 50 μm or less.

11. The system according to claim 7, wherein the nonaqueous electrolyte secondary battery has a laminate structure in which the positive electrode and the negative electrode are alternately laminated while sandwiching the separator therebetween.

12. The system according to claim 7, wherein the separator has a band shape and is folded in a zigzag shape and the positive electrode and the negative electrode are alternately inserted into the folded parts of the separator.

13. A charging type vacuum cleaner comprising the battery module system according to claim 1.

14. A method of charging a battery module comprising battery units which are connected in series, each of the battery units comprising a unit cell having a voltage variation rate A mV/% SOC at a full charge voltage $V_{H1}$ (V) larger than 20 mV/% SOC, which is a value obtained when the unit cell is charged at a current of 1 C at 25° C., the method comprising:
    a first constant-current charging at a current $I_1$ until at least one unit cell reaches the full charge voltage $V_{H1}$ (V); and
    a first constant-voltage charging which controls a voltage of the battery module to a voltage V2 given by the following equation (1)

$$V2 = V_{H2} \times n \qquad (1)$$

where $V_{H2}$ is a voltage lower than a voltage $V_{M1}$ of the unit cell, where $V_{M1}$ is a rate of variation point where rate of variation is 20 mV/% SOC, when the voltage variation rate A mV/% SOC reaches 20 mV/% SOC from less than 20 mV/% SOC and n denotes the number of battery units connected in series.

15. The method according to claim 14, further comprising a second constant-current charging at a current $I_2$ smaller than the current $I_1$ between the first constant-current charging and the first constant-voltage charging.

16. The method according to claim 14, further comprising a third constant-current charging at a current of 3 C or less after the first constant-voltage charging, and a second constant-voltage charging wherein the voltage of the battery module is controlled to a voltage not higher than a voltage $V_{H3}$ (V) given by the following equation (2), after the third constant-current charging:

$$V_{H3} = V_{H1} \times n \qquad (2)$$

where $V_{H1}$ is the full charge voltage and n denotes the number of the battery units connected in series.

17. The method according to claim 14, wherein the current $I_1$ is set such that a charging time taken until the SOC of the battery module reaches 80% from 0% is within 20 minutes.

18. The method according to claim 14, wherein the voltage V2 is set such that the SOC of the battery module after the first constant-voltage charging reaches 70 to 98%.

19. The method according to claim 14, wherein the unit cell is a nonaqueous electrolyte secondary battery comprising a positive electrode, a separator and a negative electrode containing lithium-titanium oxide.

20. The method according to claim 19, wherein the lithium-titanium oxide has a spinel structure.

* * * * *